United States Patent
Shiraishi

(10) Patent No.: US 6,172,678 B1
(45) Date of Patent: *Jan. 9, 2001

(54) IMAGE PROCESSING METHOD AND APPARATUS INCLUDING HIDDEN SURFACE REMOVAL

(75) Inventor: Naoto Shiraishi, Toyonaka (JP)

(73) Assignee: Ricoh Company, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/675,227

(22) Filed: Jul. 1, 1996

(30) Foreign Application Priority Data

Jul. 4, 1995 (JP) .................................. 7-168608

(51) Int. Cl.[7] .................................. G06T 15/00
(52) U.S. Cl. .................................. 345/419; 345/441
(58) Field of Search .................................. 395/119–133; 345/419–433, 441

(56) References Cited

U.S. PATENT DOCUMENTS

| 5,384,912 | * | 1/1995 | Ogrinc et al. | 345/523 |
| 5,448,690 | | 9/1995 | Shiraishi et al. | 345/433 |
| 5,455,900 | | 10/1995 | Shiraishi et al. | 345/441 |

FOREIGN PATENT DOCUMENTS

| 62-100878 | 5/1987 | (JP) . |
| 5-120449 | 5/1993 | (JP) . |
| 7-105404 | 4/1995 | (JP) . |

OTHER PUBLICATIONS

Foley et al. "Computer Graphics Priciples and Practice" Second Edition pp 890–893, 1990.*
Foley et al. "Computer Graphics Principles and Practice" pp 166–171, 1990.*

* cited by examiner

Primary Examiner—Almis R. Jankus
(74) Attorney, Agent, or Firm—Cooper & Dunham LLP

(57) ABSTRACT

A polygon outline shape processing device uses transformed vertex information from a geometric transformation device and, for each scan-line, converts polygon X, Y vertex information, mapping pattern vertex information and polygon Z-value information into polygon outline information. A horizontal interpolation device interpolates for the polygon interior, for each scan-line, using the polygon outline information provided by the polygon outline shape processing device. A hidden surface removal device performs a hidden surface removal operation as a result of comparing Z values of dots on a scan-line with Z values of corresponding dots previously stored in a Z-value line memory. A pixel drawing device determines mapping pattern information of dots on a scan-line, using polygon interior information provided by the horizontal interpolation device. In a pixel line memory the mapping pattern information of the dots on the scan-line is written when the result of the hidden surface removal operation allows the dots to be drawn. The mapping pattern information is used for reading out image information of basic patterns to be drawn from a mapping pattern memory.

19 Claims, 20 Drawing Sheets

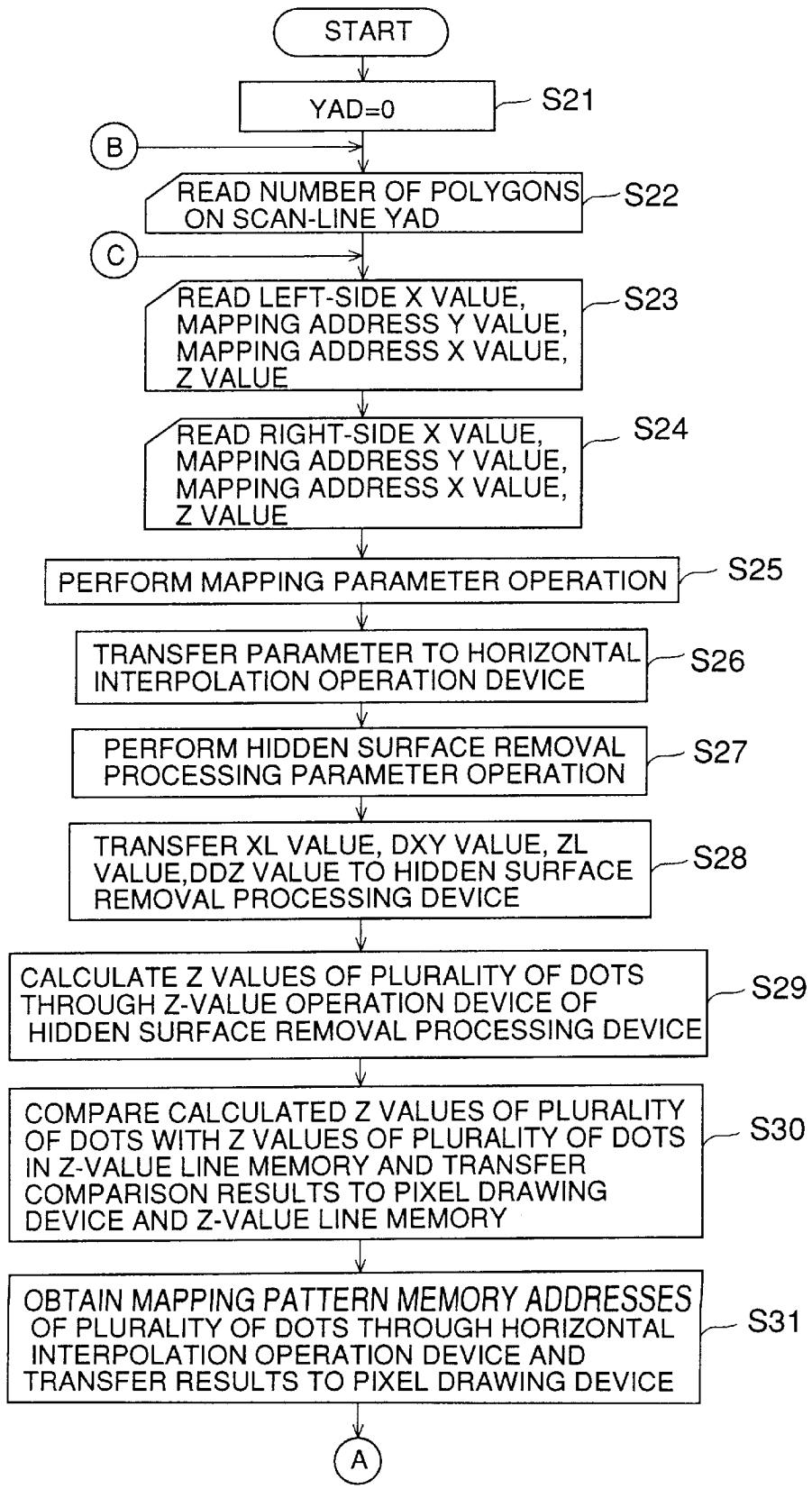

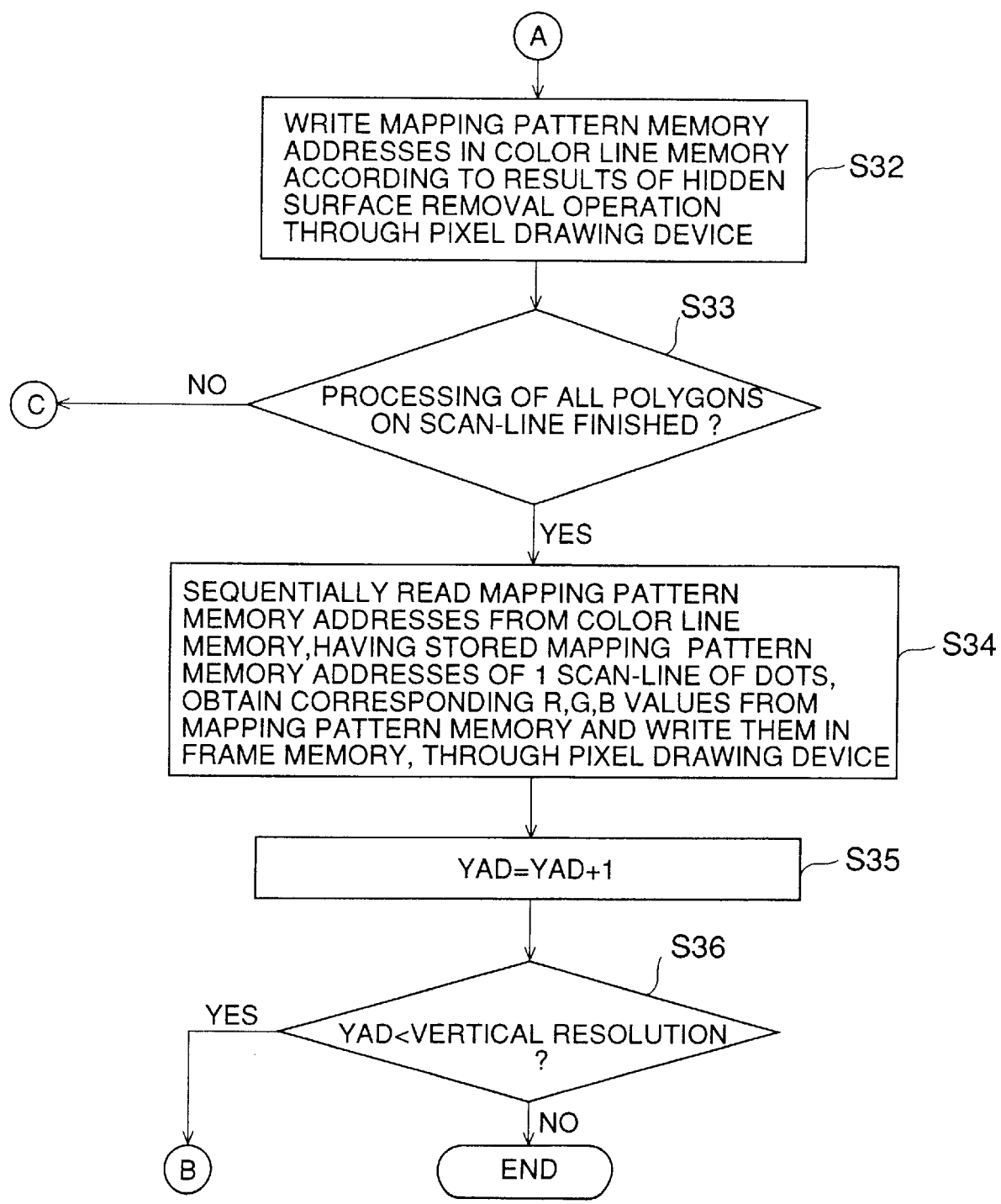

FIG.22

| Y ADDRESS | CNT | POLYGON SCAN-LINE INTERSECTION 1 | | | | POLYGON SCAN-LINE INTERSECTION 2, ---- | | | |
|---|---|---|---|---|---|---|---|---|---|
| | | LEFT-SIDE | | | | RIGHT-SIDE | | | |
| | | X VALUE | MAPPING X ADDRESS | MAPPING Y ADDRESS | Z VALUE | X VALUE | MAPPING X ADDRESS | MAPPING Y ADDRESS | Z VALUE |
| 1 | | | | | | | | | |
| 2 | | | | | | | | | |
| 3 | | | | | | | | | |
| -------- | | | | | | | | | |

WORK MEMORY

FIG.23

| POLYGON | VERTEX | X VALUE | Y VALUE | |
|---|---|---|---|---|
| 1 | 1 | Z VALUE | MX | MY |
| | 2 | X VALUE | Y VALUE | |
| | | Z VALUE | MX | MY |
| | 3 | X VALUE | Y VALUE | |
| | | Z VALUE | MX | MY |
| | 4 | X VALUE | Y VALUE | |
| | | Z VALUE | MX | MY |
| POLYGON | VERTEX | X VALUE | Y VALUE | |
| 2 | 1 | Z VALUE | MX | MY |
| | 2 | X VALUE | Y VALUE | |
| | | Z VALUE | MX | MY |

SCREEN MEMORY

FIG.24

Z - VALUE LINE MEMORY

| ADDRESS | DATA | | | | BIT |
|---|---|---|---|---|---|
| | 0 - 15 | 16 - 31 | 32 - 47 | 48 - 63 | |
| 0 | Z0 | Z1 | Z2 | Z3 | |
| 1 | Z4 | Z5 | Z6 | Z7 | |
| 2 | Z8 | Z9 | Z10 | Z11 | |
| 3 | Z12 | Z13 | Z14 | Z15 | |
| ⋮ | | | | | |
| 126 | Z504 | Z505 | Z506 | Z507 | |
| 127 | Z508 | Z509 | Z510 | Z511 | |

COLOR LINE MEMORY

| ADDRESS | DATA | | | | BIT |
|---|---|---|---|---|---|
| | 0 - 15 | 16 - 31 | 32 - 47 | 48 - 63 | |
| 0 | MXY0 | MXY1 | MXY2 | MXY3 | |
| 1 | MXY4 | MXY5 | MXY6 | MXY7 | |
| 2 | MXY8 | MXY9 | MXY10 | MXY11 | |
| 3 | MXY12 | MXY13 | MXY14 | MXY15 | |
| 4 | MXY16 | MXY17 | MXY18 | MXY19 | |
| ⋮ | | | | | |
| 126 | MXY504 | MXY505 | MXY506 | MXY507 | |
| 127 | MXY508 | MXY509 | MXY510 | MXY511 | |

MAPPING PATTERN MEMORY ADDRESS MX

MAPPING PATTERN MEMORY ADDRESS MY

MAPPING PATTERN MEMORY

| DIRECTION VECTOR | SIDE |
|---|---|
| 0 | RIGHT - SIDE |
| 1 | RIGHT - SIDE |
| 2 | RIGHT - SIDE |
| 3 | RIGHT - SIDE |
| 4 | LEFT - SIDE |
| 5 | LEFT - SIDE |
| 6 | LEFT - SIDE |
| 7 | LEFT - SIDE |
| 8 | LEFT - SIDE |

IMAGE PROCESSING METHOD AND APPARATUS INCLUDING HIDDEN SURFACE REMOVAL

BACKGROUND OF THE INVENTION

1. Field of the Invention

The present invention generally relates to a three-dimensional (simply referred to as 3D, hereinafter) image processing apparatus and method, and particularly relates to a 3D image processing apparatus and method which display on a two-dimensional (simply referred to as 2D, herein after) screen a projection image of a 3D polyhedral object.

2. Description of the Related Art

When displaying a 3D object on a 2D screen such as a CRT display by applying a perspective transformation and the like, there is a need to carry out hidden surface removal processing which makes objects hide other objects which are distanced further from the perspective view point. Methods of hidden surface removal processing include the Z-sort method, the Z-buffer method and the scan-line method.

The Z-sort method has an advantage over other methods in that it can be carried out at a high speed, but has a disadvantage in that it cannot draw objects correctly when some objects overlap other objects. The Z-buffer method eliminates this disadvantage of the Z-sort method by comparing one polygon with another polygon with regard to their distances from the perspective view point at each pixel of the image. In the Z-buffer method, the color and the depth, i.e., the Z value (the distance from the perspective view point), of a polygon are stored in a memory for each pixel of the image. When a new polygon needs to be displayed, the Z value of the new polygon is compared for each pixel with the Z value stored in the memory. only when the new Z value is smaller than the old Z value, will the Z value of the a pixel be updated. At the same time, the color of the new polygon for that pixel is stored in the memory. Thus, objects distanced further from the perspective view point are overwritten by nearer objects, which results in an appropriate image with hidden surfaces removed.

The problem is that the Z-buffer method needs a Z-buffer memory for storing a Z value of objects for each pixel, and, thus, requires a large amount of memory volume for the entire image. Further, in order to improve image drawing speed, a method may be considered in which the Z-buffer memory is connected with a image drawing processing device in dot parallel and thereby Z values of a plurality of dots are read and written in parallel. However, this method needs a plurality of memories serving as the Z-buffer memory.

The scan-line method is suitable for a serial processing, since it utilizes a strong correlation existing between adjacent pixels within one scan-line or adjacent pixels across scan-lines when displaying the color of each pixel for consecutive scan-lines. However, this method requires a large amount of computation and a complex control logic.

A method for hidden surface removal processing with a hybrid nature between the Z-buffer method and the scan-line method is disclosed in the Japanese Laid-Open Patent Application No. 62-100878, which utilizes a correlation across scan-lines and uses the Z-buffer method within one scan-line. This Laid-Open Patent Application discloses a hidden surface removal processing apparatus comprising a depth register for storing a depth (Z value), a luminance register for storing luminance data (with color), an adder for demarcating a plane segment, adding a displacement of depth, comparing depth data with each other by using a time division, an input/output device for outputting information about an input plane segment token through one pipeline register while updating that information, and a luminance data bus for outputting data stored in the luminance register. However, in the above-described apparatus, because the above-described hardware is needed for each dot on a scan-line, the size of the entire hardware may be considerably large.

An image processing apparatus which places patterns on each polygon to be displayed and thus performs mapping is disclosed in Japanese Laid-Open Patent Application No. 5-120449.

According to this image processing apparatus, patterns are placed inside a polygon and the patterns placed inside a polygon vary as a configuration of the polygon varies.

However, in the image processing apparatus which performs mapping, although mapping on polygons can be easily performed, the Z-sort method is used as the hidden surface removal for polygons. Therefore, an object may not be correctly drawn when polygons overlap other polygons.

In order to solve this problem, an image processing apparatus which performs mapping and uses the Z-buffer method as the hidden surface removal method for polygons is disclosed in Japanese Laid-Open Patent Application No. 7-105404 (corresponding to the U.S. patent application Ser. No. 08/317,116 filed on Oct. 3, 1994). This Laid-Open Patent Application discloses a method in which each polygon vertex has mapping X, Y addresses and a Z value of the polygon, the mapping X, Y addresses and polygon Z value is caused to vary along an outline of the polygon and thus an interpolation calculation is performed. Then, through the hidden surface removal using the Z-buffer method, a polygon which is located nearest to the perspective view point for a pixel position is obtained. Based on the X address of at least one end of a scan-line between two opposite sides of the obtained polygon, mapping pattern information and displacement of the mapping pattern information, a mapping pattern address is calculated. According to the calculated mapping pattern address, a mapping pattern memory is accessed, thereby R, G, B or a luminance value of each dot is read out, the read R, G, B or luminance value is transferred to a CRT, and thus an image having mapping performed thereon is displayed.

However, in the Z-buffer method in the related art used in the above-described apparatus, because a dot at the same address is updated many times in a frame memory, overall processing speed depends on the frame memory access speed capability.

Further, in a case where access in the frame memory is performed in dot parallel in order to achieve a high-speed Z-buffer hidden surface removal, because interface of the frame memory should be of a multi-bit interface, it is necessary to use as the frame memory a plurality of memories, each having a small capacity, thus data processing efficiency may not be high and high costs may be required.

SUMMARY OF THE INVENTION

An object of the present invention is to provide a 3D image processing apparatus by which the above-described problems occurring in the related art can be solved and high-speed mapping can be performed even using the Z-buffer method.

According to the present invention, mapping pattern X, Y addresses and a polygon Z value are provided for each polygon vertex, the addresses and Z values are used for interpolating mapping pattern addresses and Z values for each side of the polygon through a digital differential analysis (abbreviated 'DDA'), thus interpolated data is used for interpolating mapping pattern addresses and Z values for the interior of the polygon on a scan-line also through the DDA, a Z-buffer hidden surface removal operation is performed for a plurality of consecutive dots on the scan-line in parallel, and mapping pattern addresses of the plurality of consecutive dots on the scan line are written in a first one of two memory divisions of a color line memory when it is allowed according to the result of the hidden surface removal operation.

Thus, all the polygons on the scan-line are processed. Thereby, all the processing to be performed for the scan-line has been completed and therefore the dots of this scan-line are written in a frame memory sequentially. While the sequential writing in the frame memory is being performed as writing data is being read out from the first memory division of the color line memory, the other memory division of the color line memory is used for writing mapping memory addresses for the subsequent scan-line.

Thus, 3D image data processing including hidden surface removal is completed for each scan-line one by one sequentially. In this system, necessary memory means comprises the Z-value line memory, color line memory and frame memory. When color data is written in the frame memory, because the color data is a final one, simple unidirectional data transfer is required between the color line memory and the frame memory. As a result, it is possible to simplify a data transfer bus for the frame memory and also to use a memory, as the frame memory, having not a very high data transfer rate without substantial degradation of the overall data processing rate.

Further, for the Z-buffer hidden surface removal operation which requires a relatively complicated data transfer operation concerning memory means, the Z-value line memory which is a small line memory having a capacity for merely storing one scan-line of data is used. Therefore, it is possible to make a circuit arrangement concerning the hidden surface removal operation be compact without substantial degradation of the overall data processing rate. In fact, even if a memory having a very high data transfer rate is used for the Z-value line memory, because merely a small storage capacity is required for the memory, the memory and interface thereof will not be very bulky.

Thus, it is possible to effectively reduce the size and costs of the apparatus while the overall data processing rate thereof can be kept to be properly high.

Other objects and further features of the present invention will become more apparent from the following detailed description when read in conjunction with the accompanying drawings.

BRIEF DESCRIPTION OF THE DRAWINGS

FIGS. 21A and 21B show an operation flowchart of the polygon interior processing device in the apparatus shown in FIG. 1;

FIG. 22 illustrates a work memory in the apparatus shown in FIG. 1;

FIG. 23 illustrates a screen memory in the apparatus shown in FIG. 1;

FIG. 24 illustrates a Z-value line memory in the apparatus shown in FIG. 1;

DETAILED DESCRIPTION OF THE PREFERRED EMBODIMENTS

Descriptions will be given of the preferred embodiments of the present invention.

Figure 1:
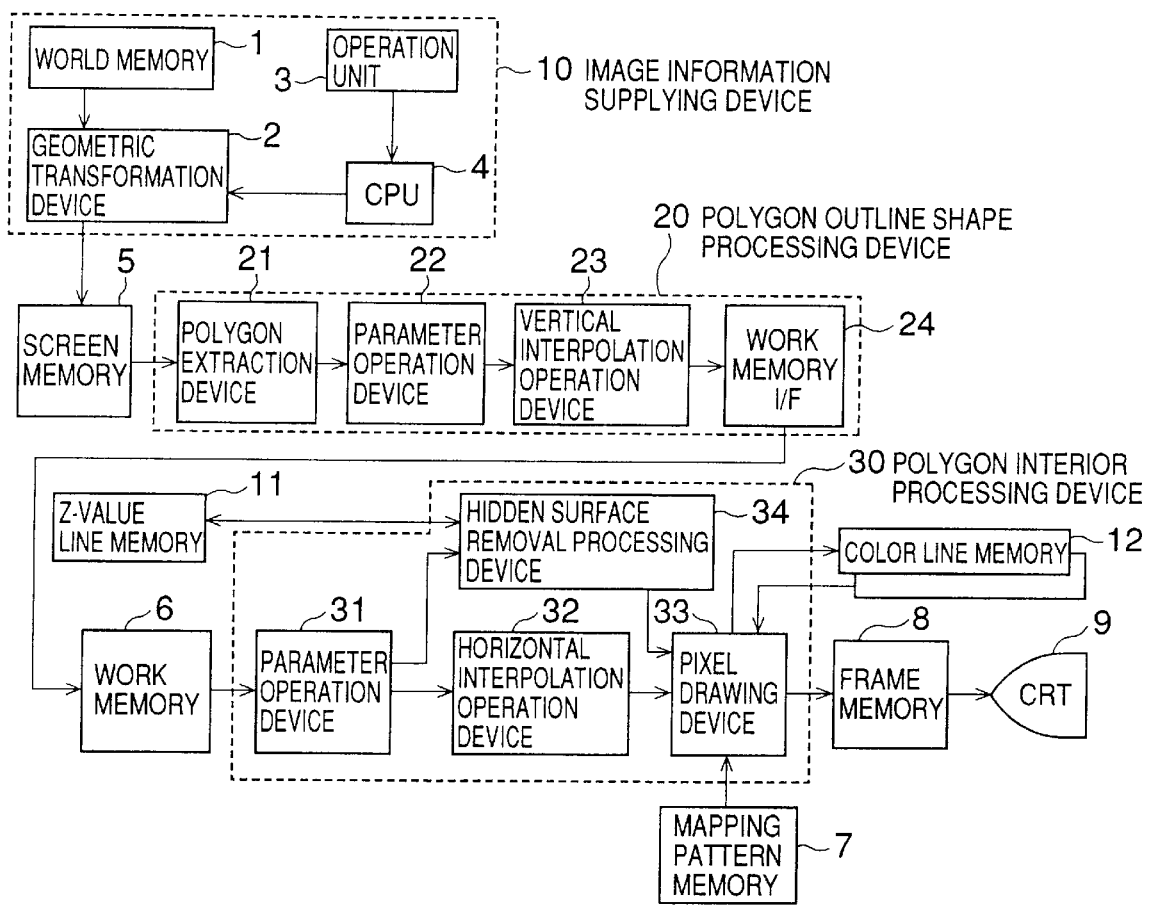
FIG. 1 shows a block diagram of a 3D image display apparatus in a first embodiment of the present invention.
Figure 2:
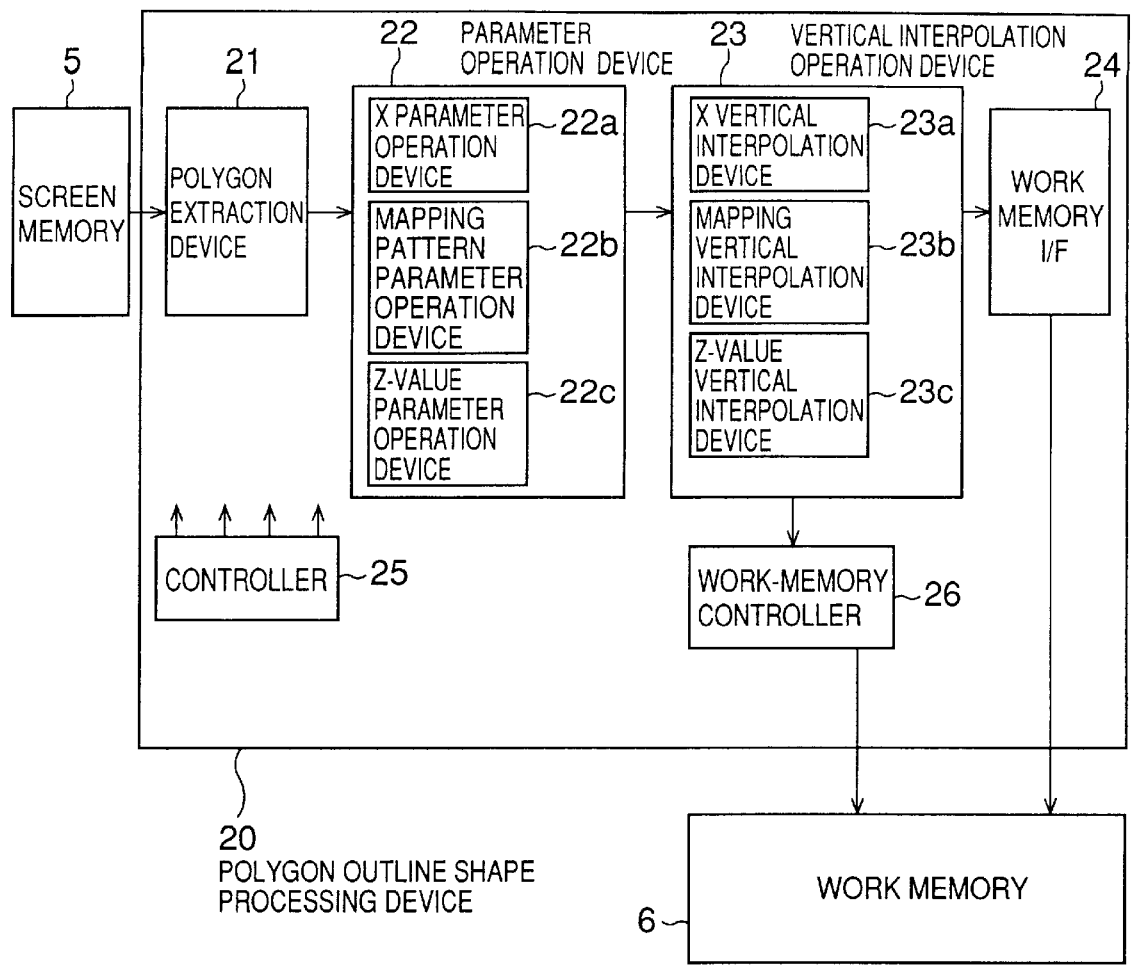
FIG. 2 shows a block diagram of a polygon outline shape processing device in the apparatus shown in FIG. 1.

FIG. 1 shows a block diagram of a pseudo-3D image processing apparatus in its entirety according to a first embodiment of the present invention. An example of this apparatus shown in FIG. 1 is suitable for racing car games and flight simulations. With reference to FIG. 1, the configuration of the first embodiment of the present invention will be described.

The apparatus includes an image information supplying device 10 which comprises a world memory 1, a geometric transformation device 2, an operation unit 3, and a CPU 4. The world memory 1 stores the X, Y and Z coordinates of vertices of polygons in world coordinates, and those polygons are used to represent any object of any shape. The world memory 1 also stores the X, Y and Z coordinates of polygon vertices in object coordinates and the vertex information for a mapping pattern memory which stores texture images for polygons. The operation unit 3 used for a virtual vehicle is comprised of a steering wheel, an accelerator pedal, a break pedal, etc., and operations on those are transformed into electric signals, which are sent to the CPU 4.

The CPU 4 calculates status data corresponding to a current status of the virtual vehicle by using the signals generated by the operations on the operation unit 3.

The geometric transformation device 2 reads out the vertex information of each polygon from the world memory 1 in response to instructions from the CPU, carries out a matrix operation necessary for incorporating object movement and a rotational change of the view, carries out a geometric transformation such as projecting world coordinate vertices into X and Y screen coordinates and provides a screen memory 5 with 2D screen data comprising those X and Y screen coordinates. The geometric transformation device 2 also determines a representative value of a view converted polygon, that is, a representative value of the distance of the polygon from the view point, i.e., Z value, and provides that value for the screen memory 5. The screen memory 5 is formatted as shown in FIG. 23, and stores, for each polygon vertex, the X and Y screen coordinates, the Z value and the X and Y coordinates of the mapping pattern memory (MX and MY).

Figures 27, 28:
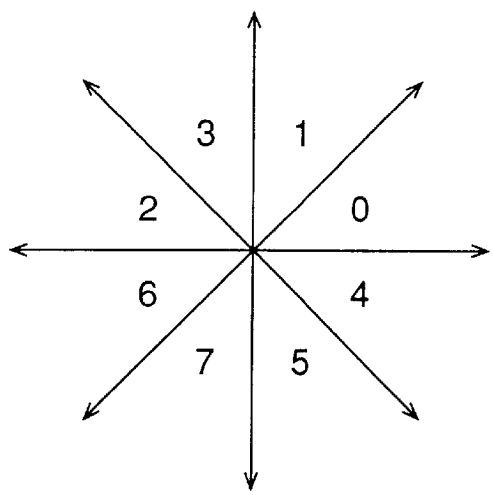
FIG. 27 illustrates a relationship between polygon side vector directions.
FIG. 28 illustrates a relationship between polygon direction vectors and left/right-sides.

A polygon outline shape processing device 20 (which can be practiced using a CPU) comprises a polygon extraction device 21, a parameter operation device 22, a vertical interpolation operation device 23 and a work-memory interface (I/F) 24. Based on the X, Y addresses of polygon vertices read out from the screen memory 5, the polygon extraction device 21 determines which direction of FIG. 27 corresponds to each of the side vectors constituting the polygon, and determines whether the vertices of the sides constituting the polygon belong to a right-side or a left-side as shown in FIG. 28 according to the determined direction. The polygon extraction device 21 further reads out from the screen memory 5 information of the vertices of each side constituting the polygon, i.e., the start address and end address of X (XS and XE), the start address and end address of Y (YS and YE), the start address and end address of X of a mapping pattern forming texture (MXS and MXE), and the start address and end address of Y of the mapping pattern forming texture (MYS and MYE). The polygon extraction device 21 also reads out the Z value of the polygon, and provides the parameter operation unit 22 with each of the above data.

The parameter operation unit 22 of the polygon outline shape processing device 20 calculates parameters necessary for digital differential analysis to obtain outline information of the polygon, and provides those parameters for the vertical interpolation operation device 23. The vertical interpolation operation device 23 calculates outline information, mapping pattern addresses and Z values by interpolating vertices for each of the left-side and the right-side of the polygon intersecting each scan-line. Each calculated data is provided for a work memory 6 through the work-memory I/F 24. The details of the polygon outline shape processing device 20 will be described later.

The work memory 6 is formatted as shown in FIG. 22, and stores the data provided by the polygon outline shape processing device 20, i.e., for each scan-line, the polygon left-side and right-side values (XL, XR), the left-side mapping memory address (MXL), the right-side mapping memory address (MXR), the left-side Z value (ZL) and the right-side Z value (ZR). Each scan-line corresponds to a resolution unit in a vertical (Y) direction, and, thus, the data being stored for each scan-line is stored for each Y address.

The work memory 6 also stores the number of polygons (CNT) contained in one Y address. That is, the number of polygons is counted up as one Y address receives a new polygon, and this number (CNT) is written into the work memory 6.

The data stored in the work memory 6 is then provided for a polygon interior processing device 30. The polygon interior processing device 30 comprises a parameter operation device 31, a horizontal interpolation operation device 32, a pixel drawing device 33 and a hidden surface removal processing device 34.

The parameter operation device 31 receives from the work memory 6 for each scan-line the X values (XL and XR), the mapping pattern addresses (MXL, MXR), and the Z values (ZL and ZR) of the left-sides and the right-sides of the polygons. The parameter operation device 31 then calculates parameters necessary for a horizontal interpolation operation, and provides those parameters for the horizontal interpolation operation device 32 and hidden surface removal processing device 34.

Figure 16:
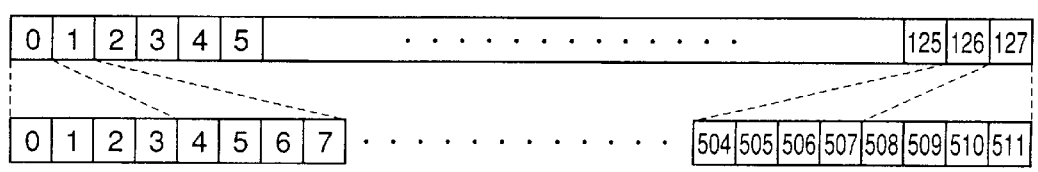
FIG. 16 illustrates an example of divisions of one scan-line in the apparatus shown in FIG. 1.

The hidden surface removal processing device 34 of the present invention performs hidden surface removal by using the Z-buffer method. The hidden surface removal processing device 34 receives the parameters from the parameter operation device 31 for each scan-line, and calculates the Z values of a plurality of consecutive dots from the parameters. The obtained Z values of the plurality of dots are compared with Z values stored in a Z-value line memory 11. The Z-value line memory 11 stores Z values for one scan-line in a dividing manner in this embodiment as shown in FIG. 16 in which an address is given for each four dots. The Z values of each four dots of the obtained dots and the Z values of four respective dots read out from the Z-value line memory 11 are used, hidden surface removal is performed in parallel. Thus, it is determined in parallel whether or not each dot is to be drawn in the pixel drawing device 33 and the Z values stored in the Z-value line memory 11 are appropriately updated.

The Z-value line memory 11 is formatted as shown in FIG. 24, and, as described above, the Z values of each plurality of dots are stored for one scan-line. That is, in this embodiment, one scan-line includes 512 dots, and, as shown in FIG. 16, the Z values of four respective dots are read out when each address is specified. Further, in this embodiment, each Z value is comprised of 16 bits of data. As shown in FIG. 24, the Z-value line memory 11 sequentially stores 16-bit Z values in a manner in which the Z values of four dots are stored in one address. When reading, the Z values of four dots are read out at the same time. Therefore, 64-bit data is transferred between the Z-value line memory 11 and the hidden surface removal processing device 34.

The pixel drawing device 33 receives mapping addresses of a plurality of dots from the horizontal interpolation operation device 32, receives from the hidden surface removal processing device 34 a control signal indicating whether or not the plurality of dots are to be drawn, and writes the mapping addresses and so forth only for the dots which are to be drawn in a color line memory 12 in parallel. In this embodiment, maximum of four dots can be processed in parallel. In this embodiment, each mapping address is comprised of 16-bit data. Therefore, 64-bit data is transferred from the pixel drawing device 33 to the color line memory 12.

Figures 25, 26:
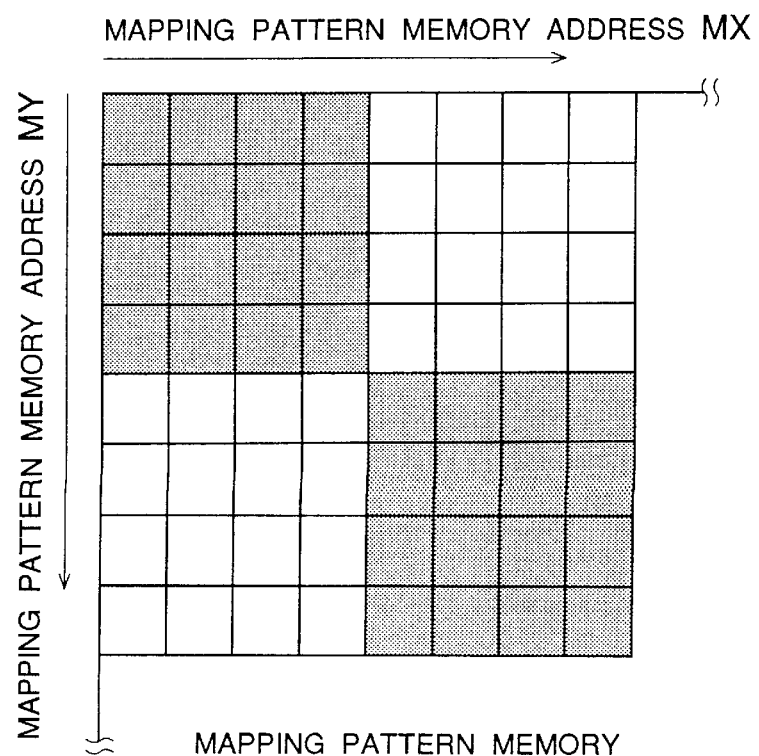
FIG. 25 illustrates a color line memory in the apparatus shown in FIG. 1.
FIG. 26 illustrates a mapping pattern memory in the apparatus shown in FIG. 1.

The color line memory 12 stores color information or an address of the mapping pattern memory for one scan-line. The information of a plurality of dots, in this embodiment, four dots, is written in the color line memory 12 in parallel. The color line memory 12 is formatted as shown in FIG. 25. 16-bit addresses of the mapping pattern memory are sequentially stored in the color line memory 12 in a manner in which the addresses of the mapping pattern memory for four dots are stored in one address.

Further, in this embodiment, the color line memory 12 comprises two sheets of memory divisions. While data writing is being performed on one sheet of the two memory divisions, the contents of the other memory division are read out. The read-out contents are used for accessing the mapping pattern memory 7, and thus-read values are written in a frame memory 8.

The horizontal interpolation operation device 32 receives from the parameter operation device 31 parameters, performs a horizontal interpolation operation and thus calculates the mapping memory addresses (MX, MY). The calculated mapping memory addresses (MX, MY) are used for accessing the mapping pattern memory 7 which stores data as shown in FIG. 26. Thereby, R, G, B or luminance (LUT) value is read from the mapping pattern memory for each dot and the read data is written in the frame memory 8. The details of the polygon interior processing device 30 will be described later.

The R, G, B or LUT values given to the frame memory 8 from the polygon interior processing device 30 are transferred to a CRT 9 and thus displayed as images.

With reference to FIGS. 2–18, the polygon outline shape processing device 20 and polygon interior processing device 30 will be described.

In this embodiment, polygons have the screen vertex coordinates (X, Y), texture coordinates, i.e., mapping pattern vertex coordinates (MX, MY), and Z values (depth values). Thereby, the hidden surface removal processing through the Z-buffer method is performed and also, a shape of texture, shown in FIG. 26 for example, is changed appropriately for shapes of the polygons, and is used for mapping on the polygons.

With reference to FIGS. 2–8, polygon outline shape processing performed by the polygon outline shape processing device 20 will be described.

For the outline shape processing, the polygon extraction device 21 determines, based on the polygon vertex X, Y addresses read out from the screen memory 5, which direction of the directions shown in FIG. 27 the vector of each side of the polygon belongs to. According to the determined vector direction, as shown in FIG. 28, it is determined whether the vertices of the sides of the polygons belong to the right-side or the left-side.

The screen memory 5 stores the screen vertex coordinates (X, Y), mapping pattern vertex coordinates (MX, MY) and polygon Z values. The polygon extraction device 21 of the polygon outline shape processing device 20 accesses the screen memory 5, reads out therefrom the screen vertex coordinates (X, Y), mapping pattern vertex coordinates (MX, MY) and polygon Z values, makes a decision on each side of each polygon as to a right-side or a left-side in order to calculate an outline shape of each polygon with the digital differential analysis (abbreviated 'DDA'), and provides data of each side for the parameter operation device 22 for calculating parameters. Here, an X parameter operation device 22a (shown in FIG. 2) is provided with screen coordinates, a mapping pattern parameter operation device 22b is provided with the screen coordinate (X, Y) and mapping pattern coordinates (MX, MY) of the start point and the end point of each side, and a Z parameter operation device 22c is provided with the screen coordinates (X, Y) and Z values (ZS, ZE) of the start point and end point of each side.

The X parameter operation device 22a of the polygon outline shape processing device 20 calculates a distance in the Y direction (DY) from the Y start point address (YS) and end point address (YE) of each side in the screen coordinates provided by the polygon extraction device 21. That is, the operation DY=YE−YS is performed. Then, a distance (DX) in the X direction between the X end point (XE) and start point (XS) is calculated and thus the operation DX=XE−XS is performed. Using the DY and DX, the operation DDX=DX/DY is performed for obtaining a derivative differential value DDX to be used as a parameter for polygon outline shape digital differential analysis (DDA). The value DDX is transferred to an X vertical interpolation device 23a which then performs an interpolation operation, thus obtains the interpolated data, and the obtained data is stored in the work memory 6 via the work-memory I/F 24.

As shown in the following equation (1), the X parameter operation device 22a calculates the derivative differential value, and, as shown in the following equation (2), the X vertical interpolation operation device 23a performs the interpolation operation and thus calculates addresses between the start point to the end point for each side. An initial value of X in the equation (2) is the start point data (XS):

$$DDX=(XE-XS)/DY \qquad (1); \text{ and}$$

$$X=X+DDX \qquad (2).$$

The mapping pattern parameter operation device 22b and a mapping vertical interpolation device 23b perform mapping pattern coordinate outline shape processing. In this processing, the mapping pattern vertex addresses (MX, MY) stored in the screen memory 5 are appropriately changed.

A distance (DY) in the Y direction is calculated from the Y start point address (YS) and end point address (YE) of each side in the screen coordinates provided by the polygon extraction device 21. That is, the operation DY=YE−YS is performed. Then, the mapping parameter operation device 22b derives a parameter for the digital differential analysis (DDA) for the polygon, by using equations (3) and (4) shown below, from the address data of mapping pattern start point addresses (MXS, MYS) and end point addresses (MXE, MYE) from the screen memory 5 via the polygon extraction device 21. Those parameters are transferred to the mapping vertical interpolation device 23b.

The mapping vertical interpolation device 23b, as shown in equations (5) and (6) shown below, performs an interpolation operation, thus calculates data from the end point to the start point of each side, and stores the data in the work memory 6. An initial value of MX in the equation (5) is the start point data MXS and an initial value of MY in the equation (6) is the start point data MYS. The operations of the equations (5) and (6) are repetitively performed for '0' to DY.

$$DMX=(MXE-MXS)/DY \quad (3);$$

$$DMY=(MYE-MYS)/DY \quad (4);$$

$$MX=MX+DMX \quad (5); \text{ and}$$

$$MY=MY+DMY \quad (6).$$

Further, through the digital differential analysis (DDA) by a Z-value parameter operation device 22c and a Z-value vertical interpolation device 23c, based on equations (7) and (8) shown below, data for the polygon is calculated from the address data of a Z-value start point address (ZS) and an end point address (ZE) read out from the screen memory 5. The calculated data is stored in the work memory 6. That is, as shown in the equation (7), the derivative differential value thereof is calculated, and, as shown in the equation (8), an interpolation operation is performed and the data for the end point to the start point of each side is calculated. An initial value of Z in the equation (8) is the start point data (ZS). The operation of the equation (8) is repeated for '0' to DY.

$$DDZ=(ZE-ZS)/DY \quad (7); \text{ and}$$

$$Z=Z+DDZ \quad (8).$$

In this embodiment, in synchronization with scan-lines, for each Y address showing the vertical location of each scan-line, an outline shape of a polygon, the outline shape address information of a mapping pattern transformed according to the shape of the polygon and the outline shape address information of the Z values are stored in the work memory 6.

Figure 19:
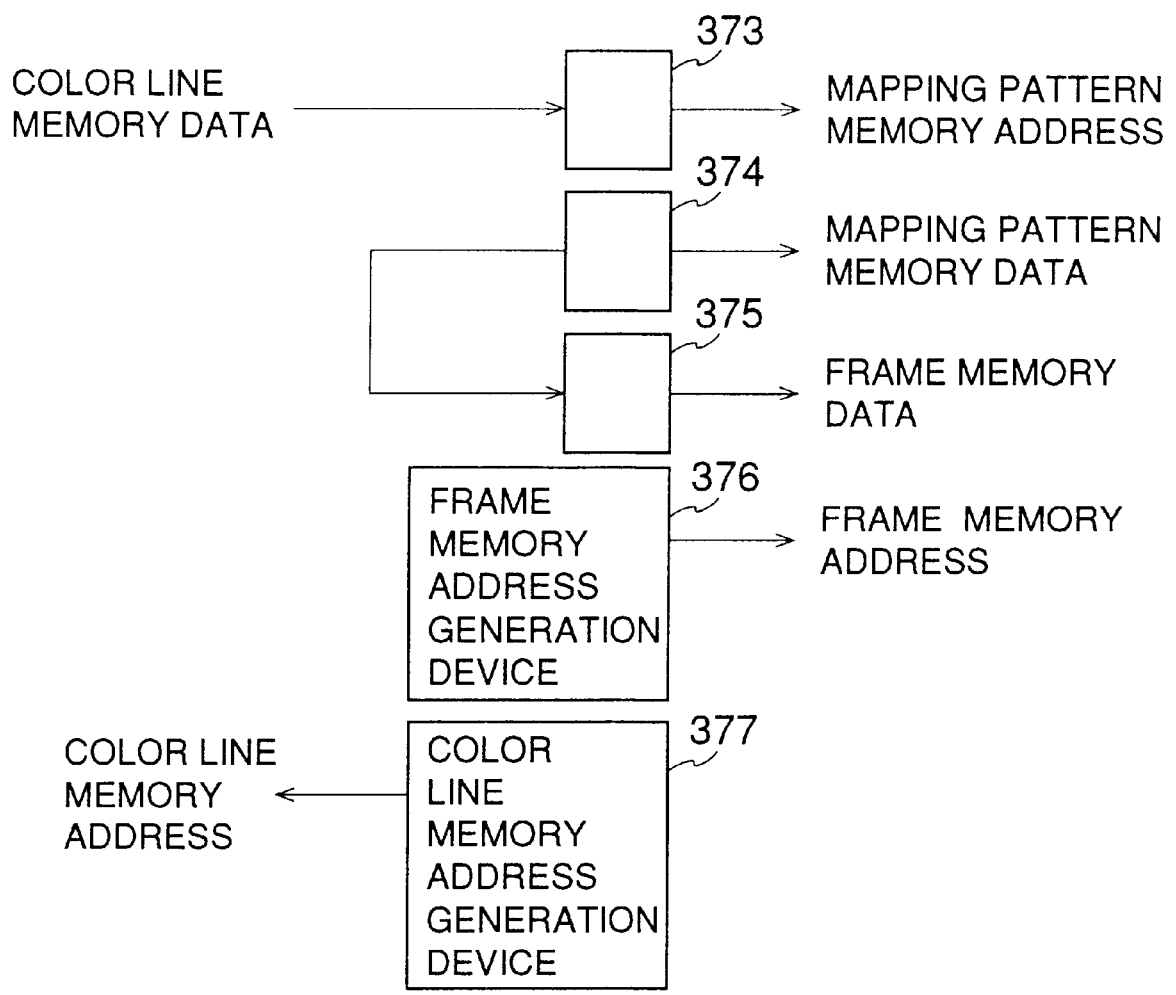
FIG. 19 shows a block diagram of a frame memory transfer device in the pixel drawing device shown in FIG. 17.

Those devices are controlled by a controller 25, and the controller 25 controls the parameter operation device 22 and vertical interpolation operation device 23 according to the flowchart shown in FIG. 19 and thus interpolates between vertices through the DDA (Digital Differential Analysis).

Figure 3:
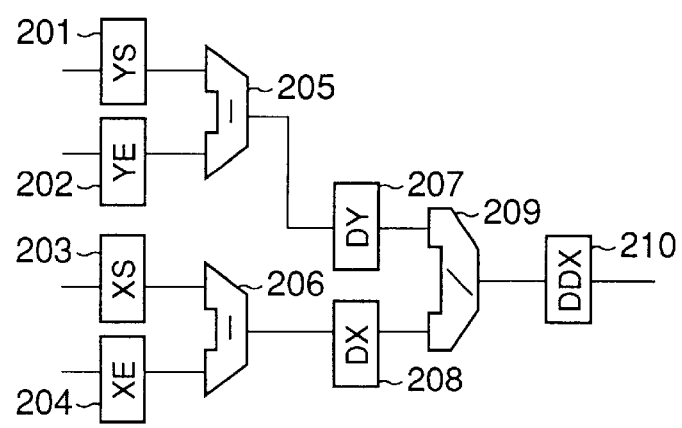
FIG. 3 shows a block diagram of an X parameter operation device in the polygon outline shape processing device shown in FIG. 2.

With reference to FIGS. 3–8, a specific arrangement example of the polygon outline shape processing device 20 will be described. FIG. 3 shows a circuit diagram of a specific arrangement of the X parameter operation device 22a.

The X parameter operation device 22a calculates X parameters which are used for the vertical interpolation operation.

A Y start point address (YS) read out from the screen memory 5 is stored in a register 201, and a Y end point address (YE) read out from the screen memory 5 is stored in a register 202. The YS and YE are input to a subtracter 205 from the registers 201 and 202.

The subtracter 205 subtracts YS from YE, and the result DY is temporarily stored in a register 207.

An X start point address (XS) read out from the screen memory 5 is stored in a register 203, and an X end point address (XE) read out from the screen memory 5 is stored in a register 204. The XS and XE are input to a subtracter 206 from the registers 203 and 204.

The subtracter 206 subtracts XS from XE, and the result DX is temporarily stored in a register 208.

The registers 207 and 208 provide the subtracter 205 subtraction result DY and the subtracter 206 subtraction result DX to a divider 209, respectively. The divider 209 divides the DX by DY and provides the division result DDX, that is, the derivative differential value, which is temporarily stored in a register 210 and then transferred to the X vertical interpolation device 23a.

Figure 4:
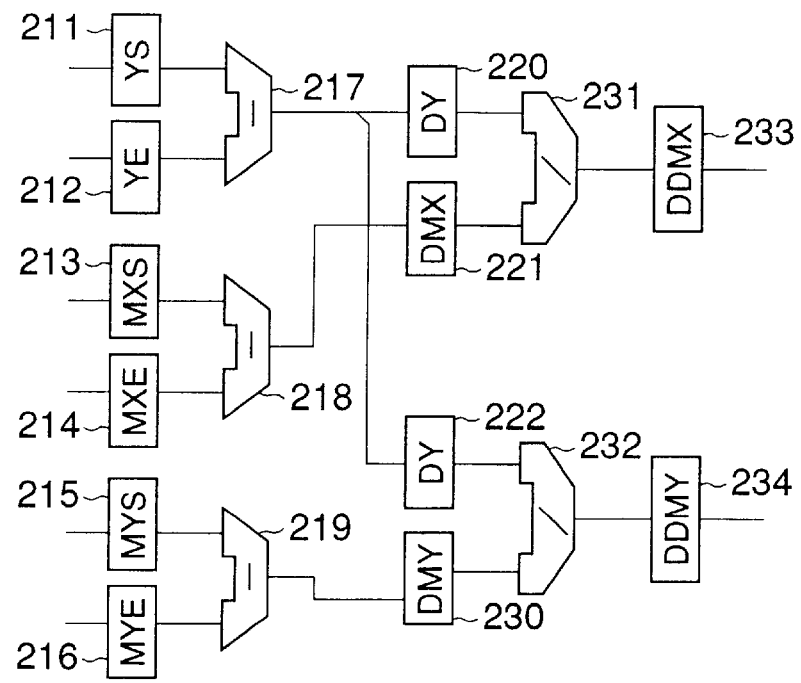
FIG. 4 shows a block diagram of a mapping parameter operation device in the polygon outline shape processing device shown in FIG. 2.

FIG. 4 shows a circuit diagram of a specific arrangement of the mapping parameter operation device 22b. The mapping parameter operation device 22b calculates mapping parameters which are used in the vertical interpolation operation.

A Y start point address (YS) read out from the screen memory 5 is stored in a register 211, and a Y end point address (YE) read out from the screen memory 5 is stored in a register 212. The YS and YE are input to a subtracter 217 from the registers 211 and 212.

The subtracter 217 subtracts YS from YE, and the result DY is temporarily stored in registers 220 and 222.

The mapping memory X start point address (MXS) read out from the screen memory 5 is stored in a register 213, and the mapping memory X end point address (MXE) is stored in a register 214. The MXS and MXE are provided to a subtracter 218 from the registers 213 and 214, respectively.

The subtracter 218 subtracts the MXS from the MXE and the subtraction result DMX is temporarily stored in a register 221.

The mapping memory Y start point address (MYS) read out from the screen memory 5 is stored in a register 215, and the mapping memory Y end point address (MYE) is stored in a register 216. The MYS and MYE are provided to a subtracter 219 from the registers 215 and 216, respectively.

The subtracter 219 subtracts the MYS from the MYE and the subtraction result DMY is temporarily stored in a register 230.

The registers 220 and 221 provide to a divider 231 the subtracter 217 subtraction result DY and the subtracter 218 subtraction result DMX, and the divider 231 divides the DMX by DY. The derivative differential value DDMX calculated by the divider 231 is temporarily stored in a register 233 and then transferred to the mapping vertical interpolation device 23b.

The registers 222 and 230 provide to a divider 232 the subtracter 217 subtraction result DY and the subtracter 219 subtraction result DMY, and the divider 232 divides the DMY by DY. The derivative differential value DDMY calculated by the divider 232 is temporarily stored in a register 234 and then transferred to the mapping vertical interpolation device 23b.

Figure 5:
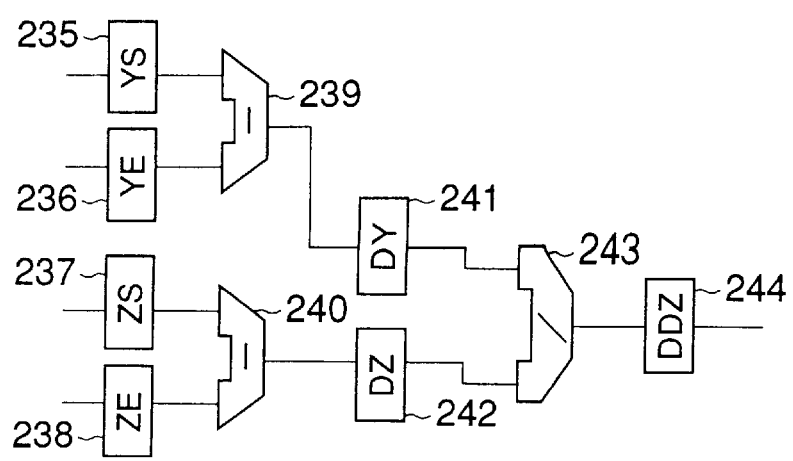
FIG. 5 shows a block diagram of a Z parameter operation device in the polygon outline shape processing device shown in FIG. 2.

FIG. 5 shows a circuit diagram of a specific arrangement of the Z parameter operation device 22c which calculates Z parameters which are used for the vertical interpolation operation.

A Y start point address (YS) read out from the screen memory 5 is stored in a register 235, and a Y end point address (YE) read out from the screen memory 5 is stored in a register 236. The YS and YE are input to a subtracter 239 from the registers 235 and 236, respectively.

The subtracter 239 subtracts YS from YE, and the result DY is temporarily stored in a register 241.

A Z start point address (ZS) read out from the screen memory 5 is stored in a register 237, and a Z end point address (ZE) read out from the screen memory 5 is stored in a register 238. The ZS and ZE are input to a subtracter 240 from the registers 237 and 238, respectively.

The subtracter 240 subtracts ZS from ZE, and the result DZ is temporarily stored in a register 242.

The registers 241 and 242 provide the subtracter 240 subtraction result DZ and the subtracter 239 subtraction result DY to a divider 243, respectively. The divider 243 divides the DZ by DY and provides the division result DDZ, that is, the derivative differential value, which is temporarily stored in a register 244 and then transferred to the Z vertical interpolation device 23c.

Figure 6:
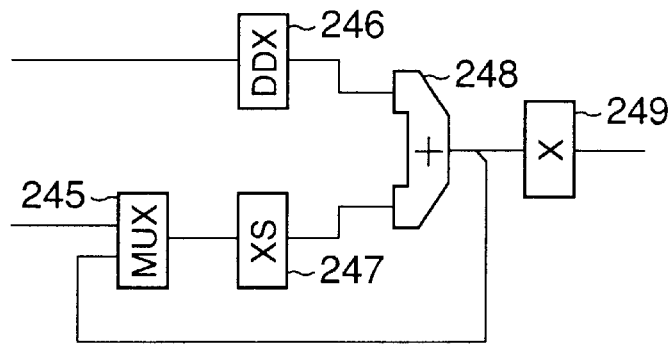
FIG. 6 shows a block diagram of an X vertical interpolation device in the polygon outline shape processing device shown in FIG. 2.

With reference to FIG. 6, the X vertical interpolation device 23a will be described.

The screen coordinate XS transferred from the X parameter operation device 22a is stored in a register 247 via a multiplexer 245.

The multiplexer 245, only when receiving a start signal, transfers the value from the X parameter operation device 22a to the register 247. The multiplexer 245, otherwise, transfers the output of an adder 248 to the register 247.

A register 246 temporarily stores the parameter DDX transferred from the X parameter operation device 22a.

The register 246, when the start signal is given, has the stored value transferred to the adder 248. The adder 248 adds the X to the DDX, and provides the addition result X for a register 249. The register 249 is controlled by a work-memory controller 26 shown in FIG. 2 and the addition result X is stored in the work memory 6 via the work-memory I/F 24.

Figure 7:
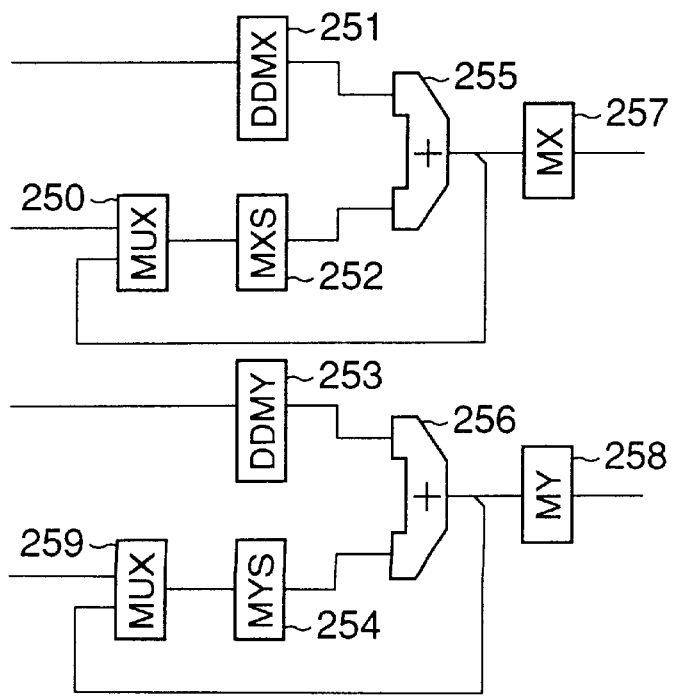
FIG. 7 shows a block diagram of a mapping vertical interpolation device in the polygon outline shape processing device shown in FIG. 2.

With reference to FIG. 7, the mapping vertical interpolation device 23b will be described.

The mapping pattern memory address coordinate MXS transferred from the mapping parameter operation device 22b is stored in a register 252 via a multiplexer 250.

The multiplexer 250, only when receiving the start signal, transfers the value from the mapping parameter operation device 22b to the register 252. The multiplexer 250, otherwise, transfers the output of an adder 255 to the register 252.

A register 251 temporarily stores the parameter DDMX transferred from the mapping parameter operation device 22b.

The register 251, when the start signal is given, has the stored value transferred to the adder 255. The adder 255 adds the MX to the DDMX, and provides the addition result MX to a register 257. The register 257 is controlled by the work-memory controller 26 and the addition result MX is stored in the work memory 6 via the work-memory I/F 24.

The mapping pattern memory address coordinate MYS transferred from the mapping parameter operation device 22b is stored in a register 254 via a multiplexer 259.

The multiplexer 259, only when receiving the start signal, transfers the value from the mapping parameter operation device 22b to the register 254. The multiplexer 259, otherwise, transfers the output of an adder 256 to the register 254.

A register 253 temporarily stores the parameter DDMY transferred from the mapping parameter operation device 22b.

The register 253, when the start signal is given, has the stored value transferred to the adder 256. The adder 256 adds the MY to the DDMY, and provides the addition result MY to a register 258. The register 258 is controlled by the work-memory controller 26 and the addition result MY is stored in the work memory 6 via the work-memory I/F 24.

Figure 8:
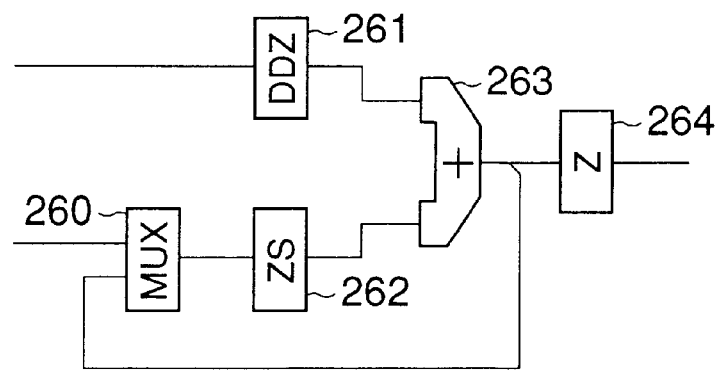
FIG. 8 shows a block diagram of a Z vertical interpolation device in the polygon outline shape processing device shown in FIG. 2.

With reference to FIG. 8, the Z vertical interpolation device 23c will be described.

The screen coordinate ZS transferred from the Z parameter operation device 22c is stored in a register 262 via a multiplexer 260.

The multiplexer 260, only when receiving the start signal, transfers the value from the Z parameter operation device 22c to the register 262. The multiplexer 260, otherwise, transfers the output of an adder 263 to the register 262.

A register 261 temporarily stores the parameter DDZ transferred from the Z parameter operation device 22c.

The register 262, when the start signal is given, has the stored value transferred to the adder 263. The adder 263 adds the Z to the DDZ, and provides the addition result Z to a register 264. The register 264 is controlled by the work-memory controller 26 and the addition result Z is stored in the work memory 6 via the work-memory I/F 24.

Thus, the outline shape vertex information, mapping pattern memory addresses and Z values of the each scan-line intersecting left-side and right-side of the polygon are used for the interpolation operations. Each data calculated through the interpolation operations is stored in the work memory 6 via the work-memory I/F 24.

Figure 9:
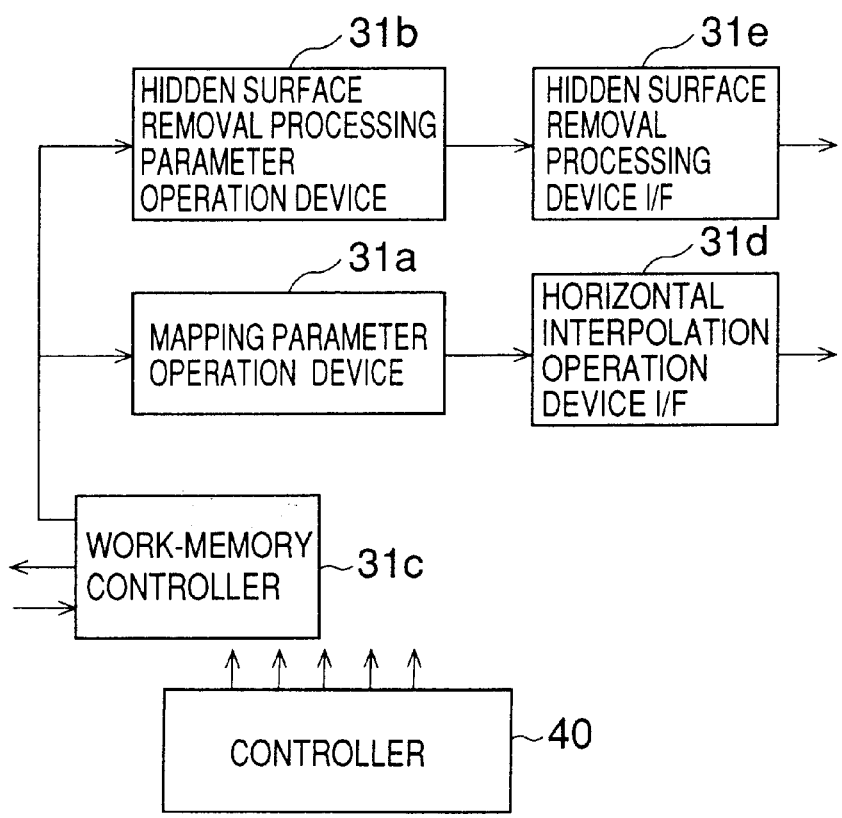
FIG. 9 shows a block diagram of a parameter operation device in a polygon internal processing device in the apparatus shown in FIG. 1.
Figure 10:
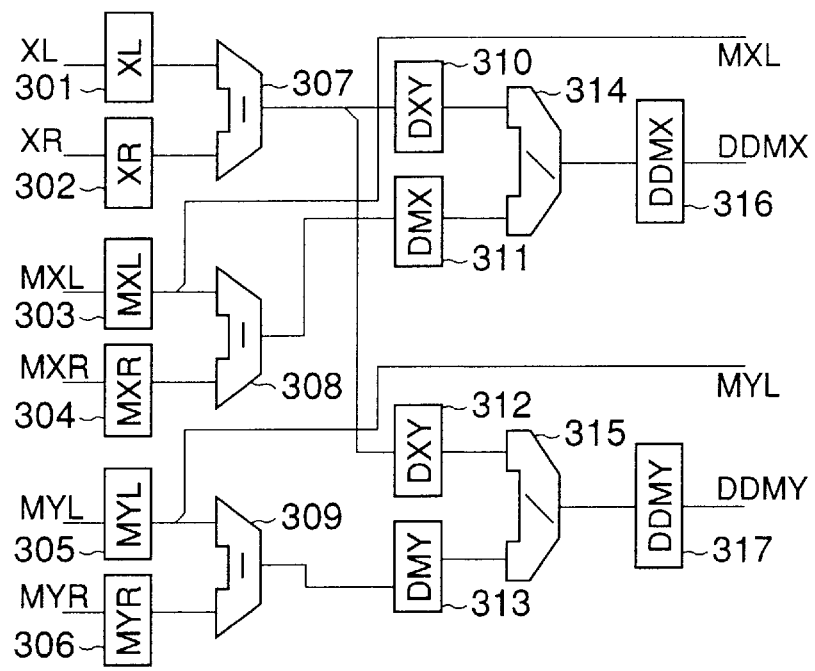
FIG. 10 shows a block diagram of a mapping parameter operation device in the parameter operation device shown in FIG. 9.
Figure 11:
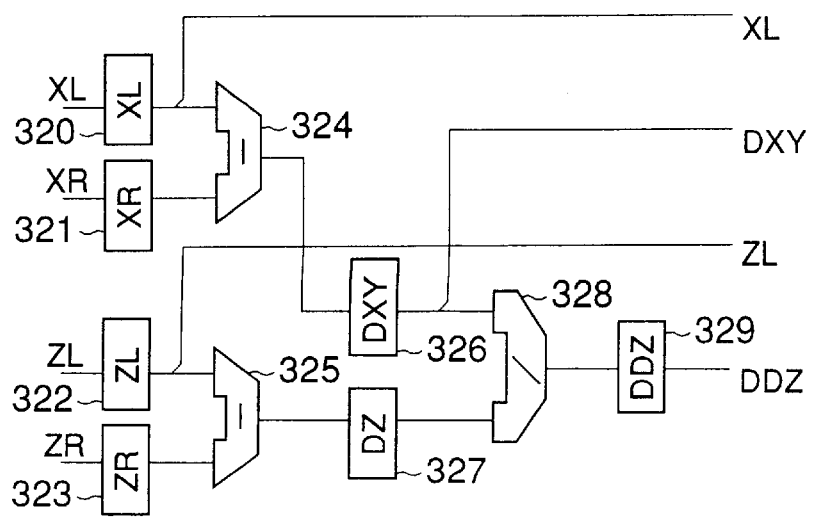
FIG. 11 shows a block diagram of a hidden surface removal processing parameter operation device in the parameter operation device shown in FIG. 9.

With reference to FIGS. 9–18, the polygon interior processing device 30 will be described. As described above, the polygon interior processing device 30 includes the parameter operation device 31, horizontal interpolation operation device 32, pixel drawing device 33 and hidden surface removal processing device 34. With reference to FIGS. 9–11, the parameter operation device 31 will be described.

For each scan-line, the parameter operation device 31 reads the X, Y addresses of two corresponding sides, that is, a left-side and a right-side, of the polygon from the work memory 6, and, based on the read information, calculates the addresses of the pixel dots inside the polygon as mapping pattern addresses and hidden surface removal parameter addresses according to equations (9), (10), (11) and (12) shown below.

Specifically, in this embodiment, the polygon outside shape representing left (L) side and right (R) side X addresses (XL and XR) corresponding to the Y address, mapping addresses (MXL, MYL, and MXR, MYR) of the transformed mapping pattern and Z values (ZL and ZR) are read out from the work memory 6.

From the left-side and right-side X addresses read out from the work memory 6, the X-direction distance DXY is calculated as shown in the equation (9).

In order to obtain internal mapping pattern addresses of the mapping pattern which has been transformed so as to fit to the polygon outline shape, using the above-mentioned DXY, the mapping pattern mapping addresses (MXL, MYL, and MXR, MYR) and Z values (ZL and ZR) read out from the work memory 6, parameters which will be used for the digital differential analysis (DDA) are calculated by a mapping parameter operation device 31a and a hidden surface removal processing parameter operation device 31b, shown in FIG. 9, using the equations (10), (11) and (12).

$$DXY = XR - XL \tag{9}$$

$$DDMX = (MXR - MXL)/DXY \tag{10}$$

$$DDMY = (MYR - MYL)/DXY \tag{11; and}$$

$$DZ = (ZR - ZL)/DXY \tag{12}$$

Then, as shown in FIG. 9, a work-memory controller 31c reads out from the work memory 6, for each Y address (scan-line), the left-side and rightside scan-line addresses (XL, XR), mapping pattern addresses (MYL, MYR), (MXL, MXR) and Z values (ZR, ZR), and transfers the read data to the mapping parameter operation device 31a and hidden surface removal processing parameter operation device 31b.

The mapping parameter operation device 31a receives, for each Y address (scan-line), the left-side and right-side scan-line addresses (XL, XR) and mapping pattern addresses (MYL, MYR), (MXL, MXR), and, according to the above-mentioned equations (9), (10) and (11), calculates a ratio of a variation in the mapping memory address MX to a variation in the polygon address X, that is, the derivative differential value DDMX and a ratio of a variation in the mapping memory address MY to a variation in the polygon address X, that is, the derivative differential value DDMY. The calculated values and the mapping pattern addresses (MXL, MYL) are transferred to the horizontal interpolation operation device 32.

FIG. 10 shows a circuit diagram of a specific arrangement of the mapping parameter operation device 31a.

Under the control of the work-memory controller 31c, for each Y address (scan-line), the left-side scan-line address XL is provided to a register 301 and the right-side scan-line address XR is provided to a register 302. The two registers 301 and 302 provide XL and XR to a subtracter 307, respectively.

The subtracter 307 subtracts XL from XR, and the subtraction result DXY is temporarily stored in registers 310 and 312, respectively.

Further, under the control of the work-memory controller 31c, the mapping memory left-side X address MXL is provided to a register 303 and the mapping memory right-side X address MXR is provided to a register 304. The two registers 303 and 304 provide MXL and MXR to a subtracter 308, respectively.

The subtracter 308 subtracts MXL from MXR, and the subtraction result DMX is temporarily stored in a register 311.

Further, under the control of the work-memory controller 31c, the mapping memory left-side Y address MYL is provided for a register 305 and the mapping memory right-side Y address MYR is provided for a register 306. The two registers 305 and 306 provide MYL and MYR to a subtracter 309, respectively.

The subtracter 309 subtracts MYL from MYR, and the subtraction result DMY is temporarily stored in a register 313.

The subtracter 307 subtraction result DXY and subtracter 308 subtraction result DMX are provided by the registers 310 and 311 to a divider 314, respectively. The divider 314 divides the DMX by DXY. The divider 314 division result DDMX is temporarily stored in a register 316 and then transferred to the horizontal interpolation operation device 32 via a horizontal interpolation operation device interface (I/F) 31d shown in FIG. 9.

The subtracter 307 subtraction result DXY and subtracter 309 subtraction result DMY are provided by the registers 312 and 313 to a divider 315, respectively. The divider 315 divides the DMY by DXY. The divider 315 division result DDMY is temporarily stored in a register 317 and then transferred to the horizontal interpolation operation device 32 via the horizontal interpolation operation device I/F 31d shown in FIG. 9.

The hidden surface removal processing parameter operation device 31b shown in FIG. 9 receives, for each Y address (scan-line), the left-side and right-side scan-line addresses (XL, XR) and Z values (ZL, ZR), performs a parameter operation according to the above-mentioned equations (9) and (12), and thus calculates the X value difference (DXY= XR−XL) and a ratio of a variation in the Z value to a variation in the X value, that is, the derivative differential value DDZ. XL, DXY, ZL and DDZ are transferred to a hidden surface removal processing device interface (I/F) 31e shown in FIG. 9.

FIG. 11 shows a circuit diagram of a specific arrangement of the hidden surface removal processing parameter operation device 31b.

Under the control of the work-memory controller 31c, for each Y address (scan-line), the left-side scan-line address XL is provided to a register 320 and the right-side scan-line address XR is provided to a register 321. The two registers 320, 321 provide XL and XR to a subtracter 324, respectively.

The subtracter 324 subtracts XL from XR, and the subtraction result DXY is temporarily stored in registers 326.

Further, under the control of the work-memory controller 31c, the left-side Z value ZL is provided to a register 322 and the right-side Z value ZR is provided to a register 323. The two registers 322, 323 provide ZL and ZR to a subtracter 325, respectively.

The subtracter 325 subtracts ZL from ZR, and the subtraction result DZ is temporarily stored in a register 327.

The subtracter 324 subtraction result DXY and subtracter 325 subtraction result DZ are provided by the registers 326, 327 to a divider 328, respectively. The divider 328 divides the DZ by DXY. The divider 328 division result DDZ is temporarily stored in a register 329 and then transferred to the hidden surface removal processing device 34 via the hidden surface removal processing device interface (I/F) 31e. The above-mentioned circuits (devices) are controlled by the controller 40 and perform operations according to a flowchart shown in FIG. 20.

Figure 12:
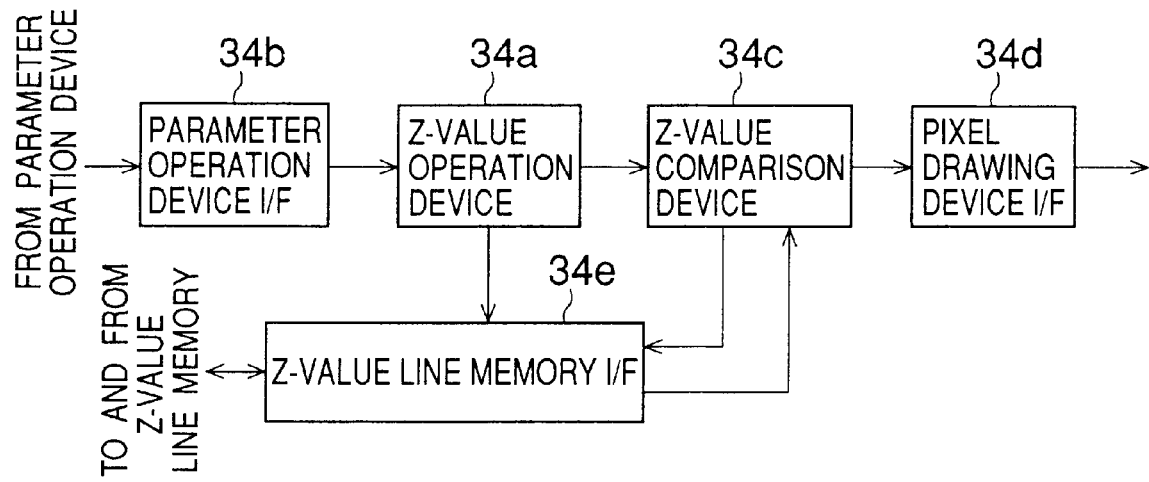
FIG. 12 shows a block diagram of a hidden surface removal processing device in the apparatus shown in FIG. 1.
Figure 13:
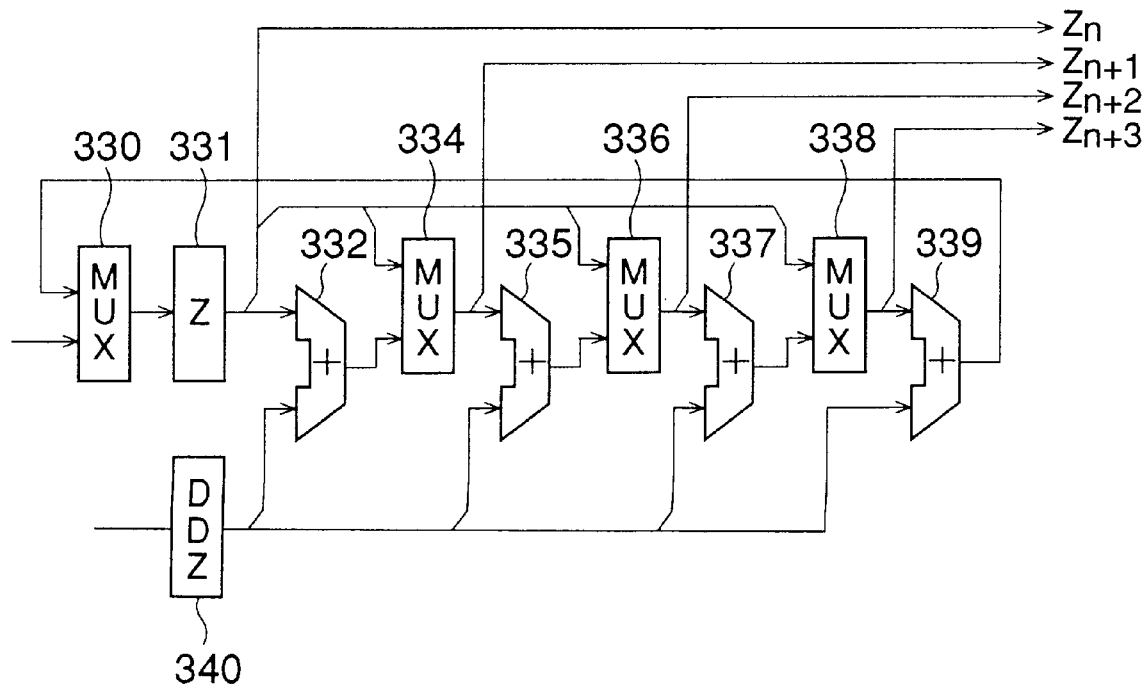
FIG. 13 shows a block diagram of a Z-value operation device in the hidden surface removal processing device shown in FIG. 12.

FIG. 12 shows a block diagram of the hidden surface removal processing device 34. The hidden surface removal processing device 34 performs the hidden surface removal using the Z-buffer method. For each scan-line, a parameter operation device I/F 34b receives the parameters from the parameter operation device 31. The received parameters are used for calculating the Z values of a plurality of dots (pixels), the calculated Z values are used for the hidden surface removal for the plurality of dots (pixels) in parallel, and thereby the pixel drawing device 33 determines in parallel whether or not the plurality of dots are to be drawn. That is, for each dot, the Z-value line memory 11 stored Z value of the polygon which is nearest to the viewpoint is compared with the Z value of the polygon which is being processed. When the Z value of the polygon being processed is smaller, the data of that polygon is transferred to the color line memory 12 and stored in the Z-value line memory 11, by updating, as the Z value which will be used for the comparison. When the Z value of the polygon being processed is larger, updating of the Z-value line memory 11 stored Z value is not performed and the Z value of the polygon being processed is not transferred to the color line memory 12. The Z-value line memory 11 initially stores the maximum possible Z value, that is, the Z value at a point farthest from the viewpoint.

The hidden surface removal processing device 34 receives from the parameter operation device 31 the left-side Z value (ZL) and Z derivative differential value (DDZ) via the parameter operation device I/F 34b. The received data is transferred to a Z-value operation device 34a.

The Z-value operation device 34a uses given Z values in the hidden surface removal according to the Z-buffer method. Z values used are the Z values of a plurality of consecutive dots on a scan-line. In this embodiment, the Z values of a plurality of consecutive dots on a scan-line are obtained in parallel using a circuit shown in FIG. 13 for example. Four adders 332, 335, 337 and 339 are provided for four consecutive dots on a scan line and thereby the Z values of four dots can be obtained in parallel. In this embodiment, as shown in FIG. 16, the resolution of each scan-line is 512 dots, and 512 dots are divided for each four consecutive dots, as shown in FIG. 16, the each four dots being processed in parallel. Because the operation may be started from the middle of a four-dot division, multiplexers 334, 336 and 338 are provided and thereby Z values input to the adders 335, 337 and 339 are appropriately switched in the Z-value operation device 34a.

At first, the left-side Z value is provided by the parameter operation device I/F 34b to a register 331 via a multiplexer 330, the Z derivative differential value (DDZ) is provided to a register 340, and the provided values are stored therein, respectively. The Z value stored in the register 331 is, as $Z_0$, provided to a Z-value comparison device 34c, to the first adder 332 and to the multiplexers 334, 336 and 338, respectively.

The derivative differential value DDZ stored in the register 340 is provided to the first, second, third and forth adders 332, 335, 337 and 339, respectively. The first adder 332 is provided with the Z value stored in the register 331 and the derivative differential DDZ, calculates the Z value $Z_1$ of a subsequent dot, and the calculated value is provided, via the multiplexer 334, to the Z value comparison device 34c and to the subsequent adder 335, respectively.

The second adder 335 calculates the Z value $Z_2$ of a subsequent dot, and the calculated value is provided, via the multiplexer 336, to the Z value comparison device 34c and to the subsequent adder 337, respectively. The third adder 337 calculates the Z value $Z_3$ of a subsequent dot, and the calculated value is provided, via the multiplexer 338, to the Z value comparison device 34c and to the last adder 339, respectively. The last adder 339 calculates a Z value which will be used for calculating the Z values of four subsequent consecutive dots. The calculated value is provided, via the multiplexer 330, to the register 331, and is stored in the register 331. Thus, the Z-value operation device 34a calculates and provides the Z values of a plurality of consecutive dots, that is, the Z values ($Z_n$, $Z_{n+1}$, $Z_{n+2}$ and $Z_{n+3}$, where 'n' is an integer equal to or greater than 0) of four consecutive dots.

The Z-value comparison device 34c performs hidden surface removal operations on the Z values of dots (pixels) provided by the Z-value operation device 34a, in parallel, and provides for the pixel drawing device 33 control signals indicating whether or not the dots are to be drawn, in parallel.

Figure 14:
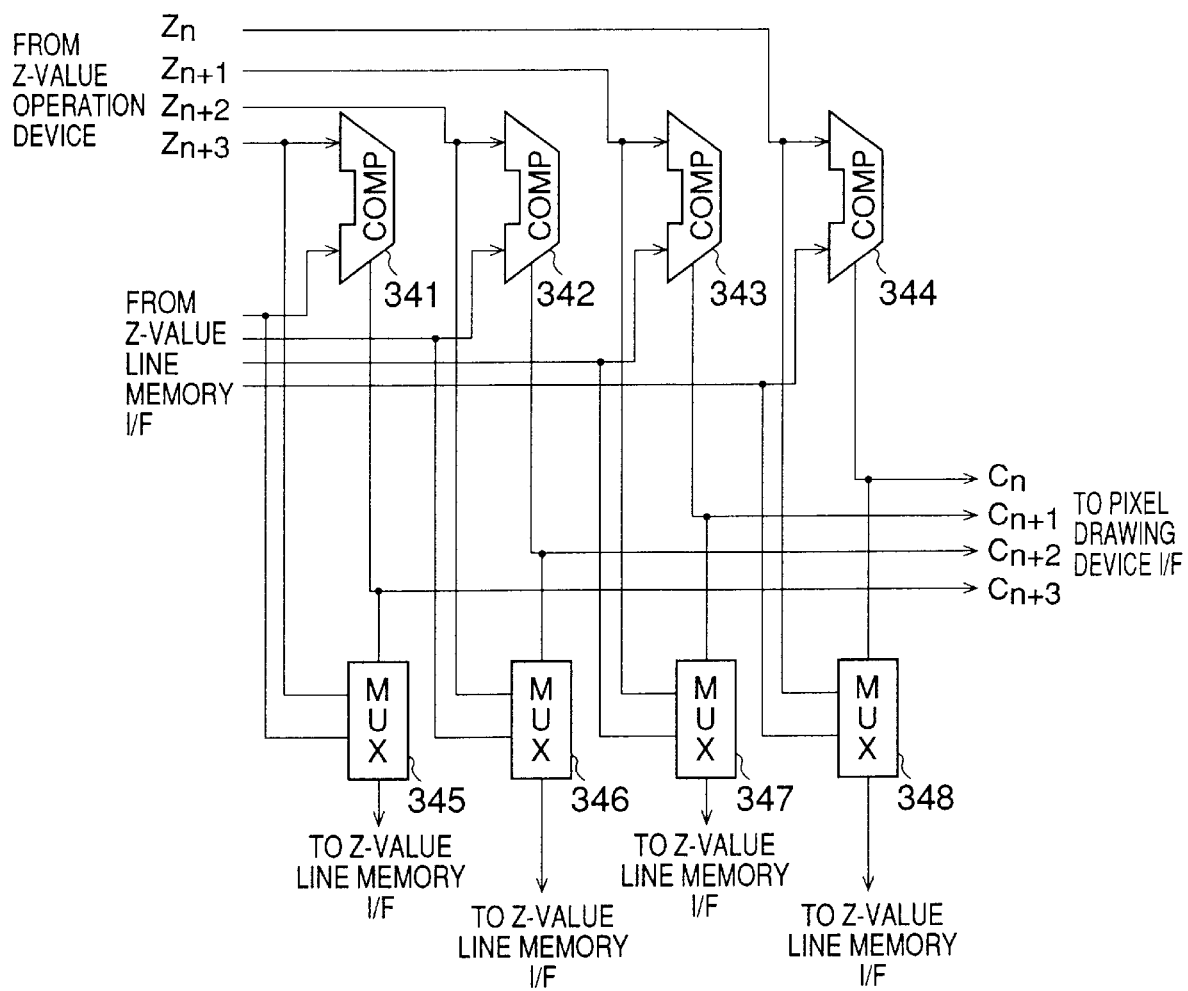
FIG. 14 shows a block diagram of a Z-value comparison device in the hidden surface removal processing device shown in FIG. 12.

FIG. 14 shows an example of the Z-value comparison device 34c. As shown in the figure, the Z-value comparison device 34c receives, from a Z-value line memory I/F 34e shown in FIG. 12, the Z values stored in the Z-value line memory 11 corresponding to a plurality of Z values ($Z_n$, $Z_{n+1}$, $Z_{n+2}$ and $Z_{n+3}$) transferred from the Z-value operation device 34a. The received Z values are provided for comparison circuits 341, 342, 343 and 344. The comparison results ($C_n$, $C_{n+1}$, $C_{n+2}$ and $C_{n+3}$) are provided for the pixel drawing device 33 via a pixel drawing device I/F 34d, shown in FIG. 12, and, also, are provided for multiplexers 345, 346, 347 and 348 which determine thereby whether or not the contents of the Z-value line memory 11 are updated. Specifically, each comparison circuit compares the Z-value line memory 11 stored Z value of the polygon nearest to the viewpoint with the Z value of the polygon being processed. Then, when the Z value of the polygon being processed is smaller, the control signal is provided to the pixel drawing device 33 indicating that the dot is to be drawn. The Z value is also provided to the Z-value line memory I/F 34e, is used to update the contents of the Z-value line memory 11, and thus will be used as the Z value to be compared with the Z value of a polygon being subsequently processed. When the Z value of the polygon being processed is larger, the control signal is provided to the pixel drawing device 33 indicating that the dot is not to be drawn, and also, because updating of the Z value is not performed on the Z-value line memory 11, the Z value read out from the Z-value line memory 11 is provided to the Z-value line memory I/F 34e.

Figure 15A:
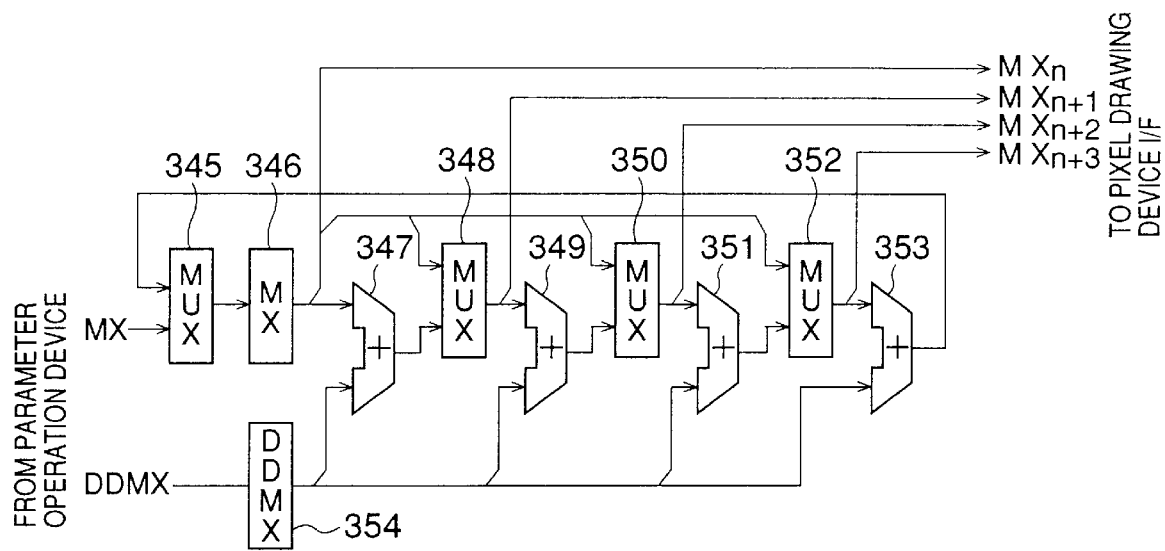
FIGS. 15A and 15B show block diagrams of an example of a horizontal interpolation operation device in the polygon internal processing device in the apparatus shown in FIG. 1.
Figure 15B:
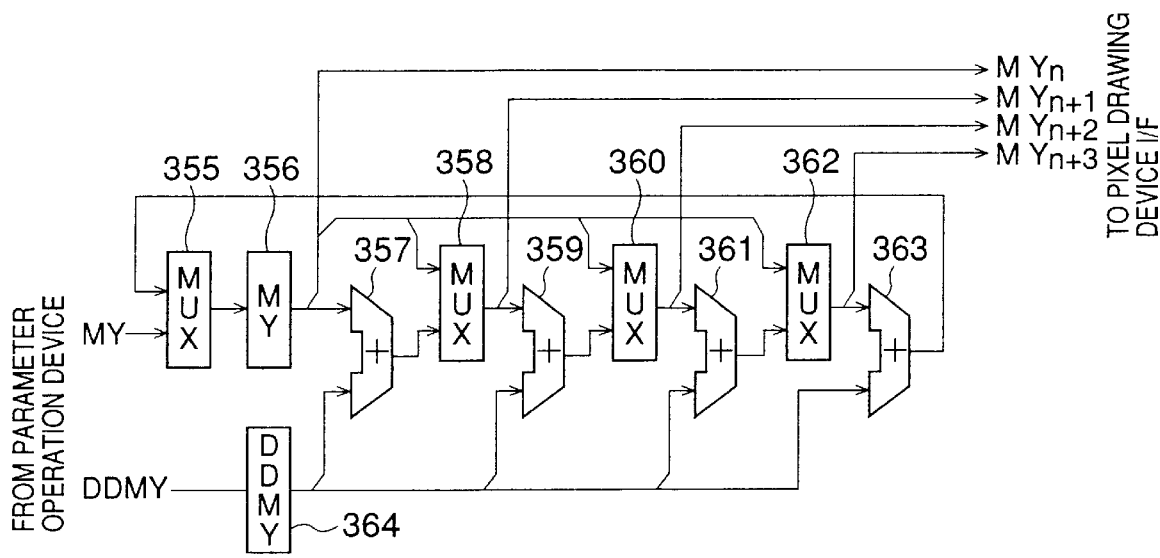

The horizontal interpolation operation device 32 will be described. FIGS. 15A and 15B show an example of the horizontal interpolation operation device 32.

In the case where the resolution of each scan-line is 512 dots, the 512 dots are divided for each four consecutive dots, as shown in FIG. 16, each four dots being processed in parallel. Because the operation may be started from the middle of a four-dot division, similar to the arrangement in the Z-value operation device 34a, multiplexers 348, 350, 352, 358, 360 and 362 are provided and thereby values input to the adders are also appropriately switched in the horizontal interpolation operation device 32.

At first, the left-side MX value is provided by the horizontal interpolation operation device I/F 31d of the parameter operation device to a register 346 via a multiplexer 345, the MX derivative differential value (DDMX) is provided to a register 354, and the provided values are stored therein, respectively. The MX value stored in the register 346 is, as MXO, provided to a pixel drawing device I/F, to a first adder 347 and to the multiplexers 348, 350 and 352, respectively.

The derivative differential value DDMX stored in the register 354 is provided to the first, second, third and forth adders 347, 349, 351 and 353, respectively. The first adder 347 is provided with the MX value stored in the register 346 and the derivative differential DDMX, and calculates the MX value $MX_1$ of a subsequent dot. The calculated value is provided, via the multiplexer 348, to the pixel drawing device I/F and for the subsequent adder 349, respectively.

The second adder 349 calculates the MX value $MX_2$ of a subsequent dot, and the calculated value is provided, via the multiplexer 350, to the pixel drawing device I/F and to the subsequent adder 351, respectively. The third adder 351 calculates the MX value $MX_3$ of a subsequent dot, and the calculated value is provided, via the multiplexer 352, to the pixel drawing device I/F and to the last adder 353, respectively. The last adder 353 calculates a MX value which will be used for calculating the MX values of four subsequent consecutive dots. The calculated value is provided, via the multiplexer 345, to the register 346, and is stored in the register 346. Thus, the horizontal interpolation operation device 32 calculates and provides the MX values of a plurality of consecutive dots, that is, the MX values ($MX_n$, $MX_{n+1}$, $MX_{n+2}$ and $MX_{n+3}$, where 'n' is an integer equal to or greater than 0) of four consecutive dots.

Similarly, for MY values, at first, the left-side MY value is provided by the horizontal interpolation operation device I/F 31d of the parameter operation device to a register 356 via a multiplexer 355, the MY derivative differential value (DDMY) is provided to a register 364, and the provided values are stored therein, respectively. The MY value stored in the register 356 is, as $MY_0$, provided to the pixel drawing device I/F, to a first adder 357 and to the multiplexers 358, 360 and 362, respectively.

The derivative differential value DDMY stored in the register 364 is provided to the first, second, third and forth adders 357, 359, 361 and 363, respectively. The first adder 357 is provided with the MY value stored in the register 356 and the derivative differential DDMY, and calculates the MY value $MY_1$ of a subsequent dot. The calculated value is provided, via the multiplexer 358, to the pixel drawing device I/F and to the subsequent adder 359, respectively.

The second adder 359 calculates the MY value $MY_2$ of a subsequent dot, and the calculated value is provided, via the multiplexer 360, to the pixel drawing device I/F and to the subsequent adder 361, respectively. The third adder 361 calculates the MY value $MY_3$ of a subsequent dot, and the calculated value is provided, via the multiplexer 362, to the pixel drawing device I/F and to the last adder 363, respectively. The last adder 363 calculates an MY value which will be used for calculating the MY values of four subsequent consecutive dots. The calculated value is provided, via the multiplexer 355, for the register 356, and is stored in the register 356. Thus, the horizontal interpolation operation device 32 calculates and provides the MY values of a plurality of consecutive dots, that is, the MY values ($MY_n$, $MY_{n+1}$, $MY_{n+2}$ and $MY_{n+3}$, where 'n' is an integer equal to or greater than 0) of four consecutive dots.

Thus, in this embodiment, horizontal mapping addresses MX and MY are obtained for each four dots in parallel and are transferred to the pixel drawing device 33.

Figure 17:
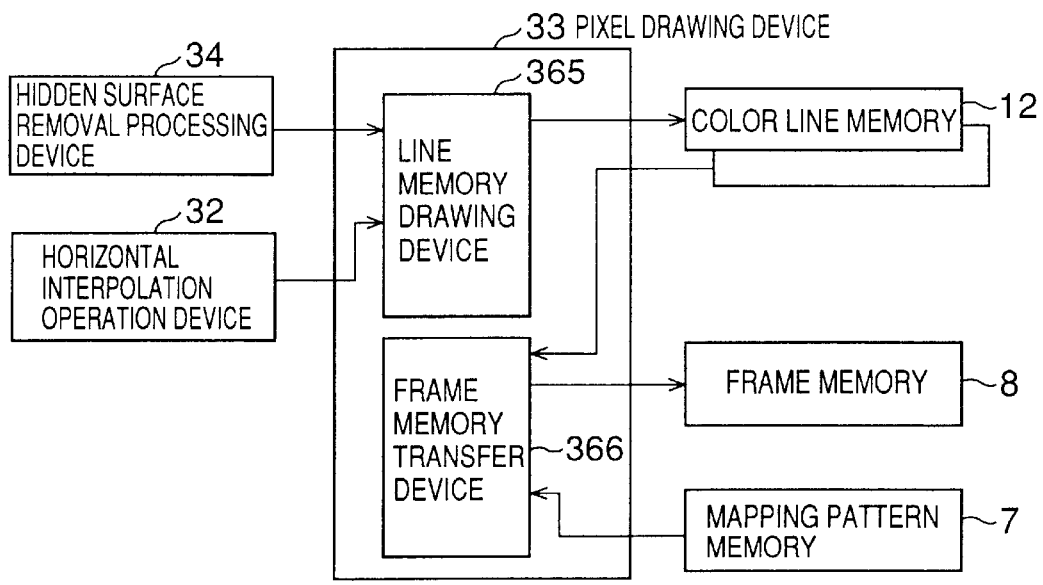
FIG. 17 shows a block diagram of a pixel drawing device in the polygon internal processing device in the apparatus shown in FIG. 1.

FIG. 17 shows a block diagram of the pixel drawing device 33.

A line memory drawing device 365 uses the mapping pattern addresses MX, MY which are provided by the horizontal interpolation operation device 32 for a plurality of dots, and the control signal, provided by the hidden surface removal processing device 34, indicating whether or not the plurality of dots are to be drawn. Thus, the line memory drawing device 365 writes the mapping pattern memory addresses and so forth in the color line memory 12.

A frame memory transfer device 366 reads, from the color line memory 12 which has the mapping pattern memory addresses written therein for a scan-line, the mapping pattern memory addresses for the scan-line, sequentially. The frame memory transfer device 366 then reads, from the mapping pattern memory 7, R, G, B values using the read mapping pattern memory addresses.

Figure 18:
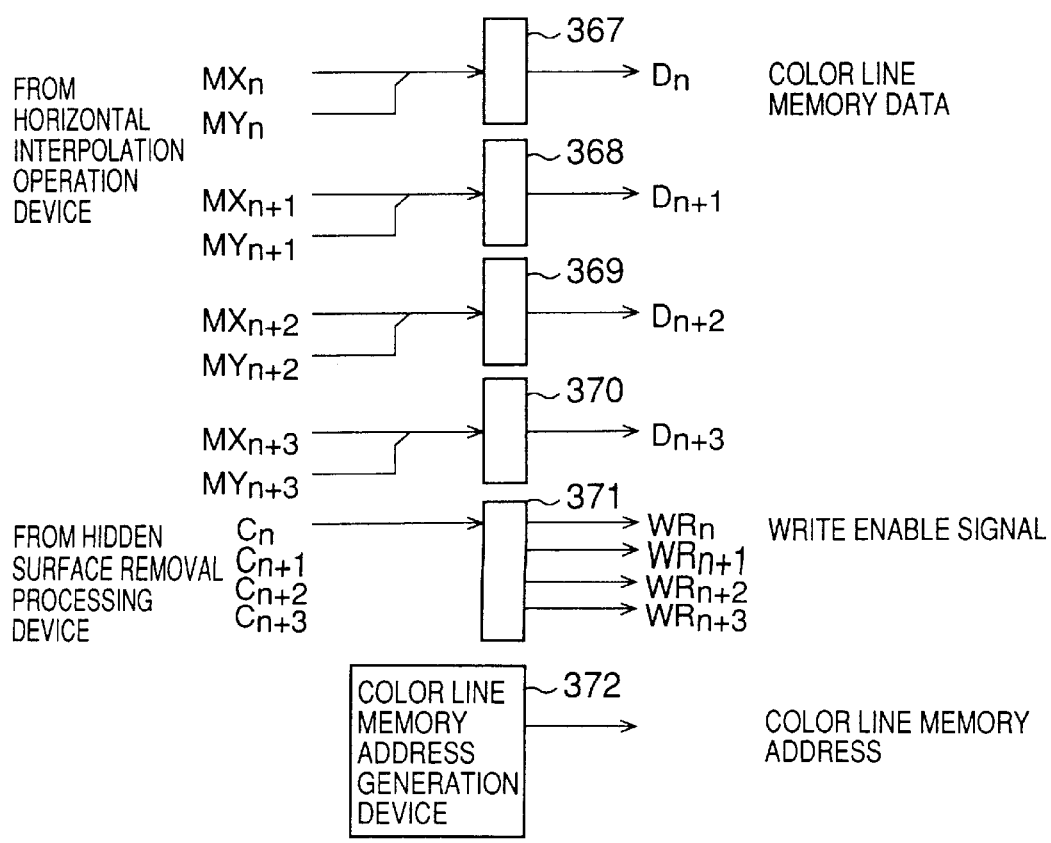
FIG. 18 shows a block diagram of a line memory drawing device in the pixel drawing device shown in FIG. 17.

FIG. 18 shows an example of the line memory drawing device 365.

Registers 367–370 receive the mapping pattern memory addresses from the horizontal interpolation operation device 32, store them and transfer them to the color line memory 12.

A flip-flop 371 stores the control signal from the hidden surface removal processing device 34 and thereby controls writing in the color line memory 12.

A color line memory address generation device 372 generates addresses of the color line memory 12.

FIG. 19 shows an example of the frame memory transfer device 366.

A register 373 stores data from the color line memory 12, provides the data as addresses of the mapping pattern memory 7 and thereby accesses the mapping pattern memory 7.

A register 374 stores R, G, B data which has been read out from the mapping pattern memory 7 as a result of the accessing using the addresses from the register 373. A register 375 is used for transferring the R, G, B data stored in the register 374 to the frame memory. A frame address generation device 376 generates addresses of the frame memory 8. A color line memory address generation device 377 generates addresses of the color line memory 12.

Figure 20:
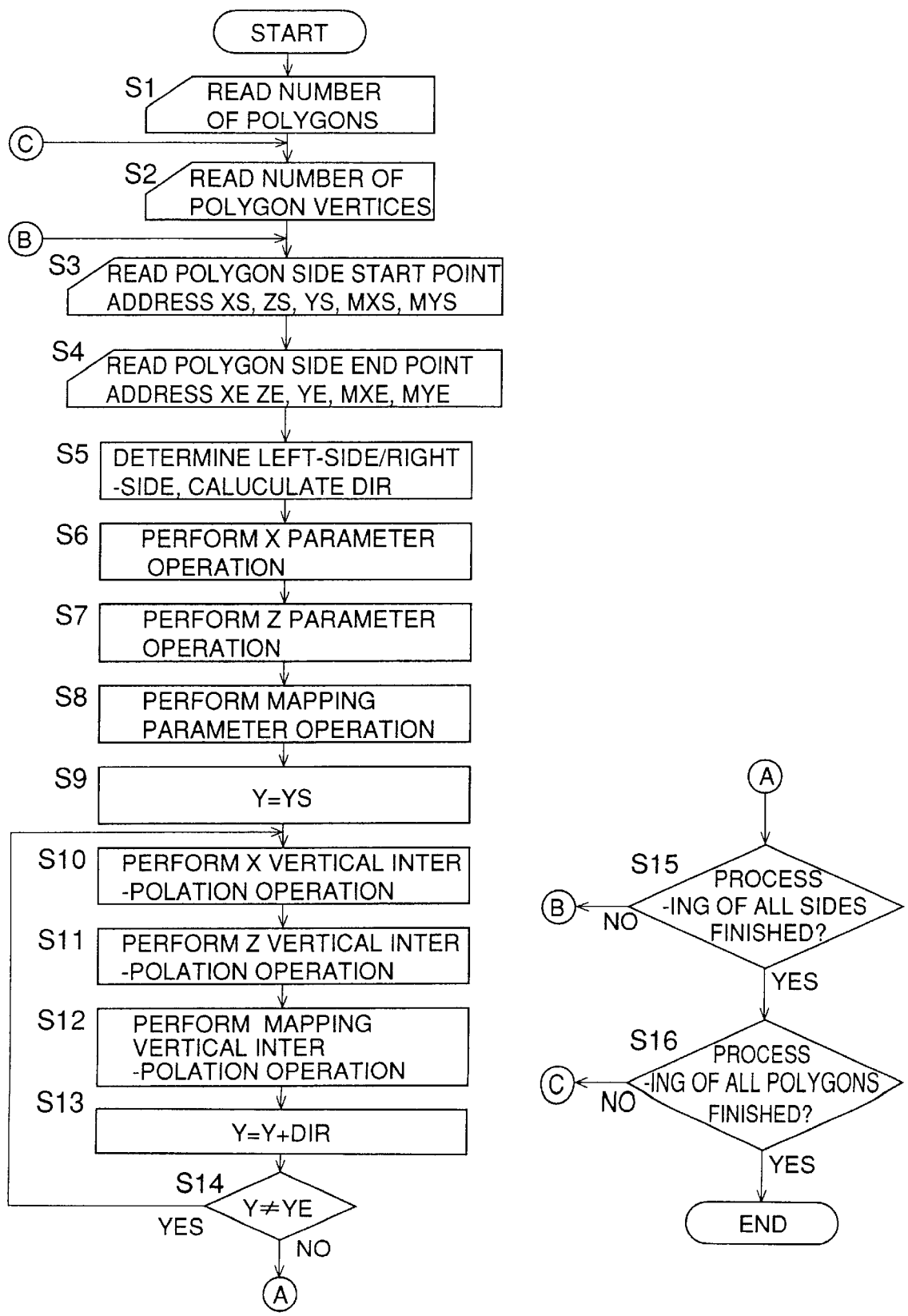
FIG. 20 shows an operation flowchart of the polygon outline shape processing device in the apparatus shown in FIG. 1.

With reference to FIGS. 20 and 21, operations of the polygon outline shape processing device 20 and polygon interior processing device 30, having the above-described circuit examples, will be described.

The operation of the polygon outline shape processing device 20 will be described. The controller 25 reads out the number (P) of polygons from the screen memory 5 in a step S1 (the term 'step' being omitted, hereinafter), reads out the number of polygon vertices to be processed in S2, and provides the numbers to the polygon extraction device 21.

In S3, start point addresses of each polygon side (XS, YS, MXS, MYS, ZS) are read out from the screen memory 5, respectively, and the accessing address of the screen memory 5 is incremented. In S4, end point addresses of each polygon side (XE, YE, MXE, MYE, ZE) are read out from the screen memory 5, respectively. Direction vectors are calculated for the polygon extraction device 21 from the read out vertex start point address (XS, YS) and end point address (XE, YE). It is determined based on the direction vectors (side vectors) whether each side is a left-side or a right-side and the polygon side direction (DIR) is set, in S5.

In S6, the X parameter operation device 22a of the polygon outline shape processing device 20 performs an operation of X parameters. YE, YS data from the screen memory 5 is provided for the subtracter in the X parameter operation device 22a and the distance DY between YS and YE is obtained.

Then, start point and end point data (XS, XE) from the screen memory 5 is provided for the subtracter in the X parameter operation device 22a, and the subtraction result (XE–XS) is provided for the divider.

The divider performs the operation (XE–) XS)/DY. Thus, the X parameter is calculated.

In S10, the X vertical interpolation device 23a uses the X parameters and performs the interpolation operation. The X parameters (DDX) are provided for the adder in the interpolation operation circuit. The adder performs the interpolation operation X+DDX. The result is written in the register, and then is written in the work memory 6 as an X address.

In S7 and S8, the Z parameter operation and mapping parameter operation are performed by the Z parameter operation device 22c and mapping parameter operation device 22b, respectively. Specifically, vertex Z addresses (ZS, ZE) and vertex mapping pattern addresses (MXS, MYS), (MXE, MYE) are provided from the screen memory 5, and the subtracters perform the operation ZE–ZS, the operation MXE–MXS and the operation MYE–MYS. The subtraction results are provided for the dividers.

The dividers are also provided with DY from the subtracter, perform the division operations with the above-mentioned subtraction results and calculate the derivative differential values in derivative differential operation circuits.

The derivative differential operation circuits perform the operation DMX=(MXE–MXS)/DY, the operation DMY= (MYE–MYS)/DY and the operation DZ=(ZE–ZS)/DY. Thus, the parameters are calculated. These operation results are provided for the adders in the mapping vertical interpolation device 23b and Z-value vertical interpolation device 23c.

In S11 and S12, the adders in the mapping vertical interpolation device 23b and Z-value vertical interpolation device 23c add the outputs of the derivative differential operation circuits to previous data set in the registers, respectively. Thus, the operation MX=MX+DMX, the operation MY=MY+DMY and the operation Z=Z+DZ are performed.

The operation results are provided for the registers, and, the values in the registers are written in the work memory 6 as the mapping pattern address data and Z-value address data.

The work memory 6 stores for each Y address, the polygon left-side X address, right-side X address, mapping pattern left-side X address, right-side X address, mapping pattern left-side Y address, mapping pattern right-side Y address, left-side Z-value address and right-side Z-value address.

In S13, the operation Y+DIR, that is, the operation of "+1" (incrementing by one) is performed when a polygon side is in a decaying direction, the operation of "−1" (decrementing by one) is performed when a polygon side is in a rising direction. In S14, it is determined whether or not Y=YE. When Y is not equal to YE, the current operation returns to S10 and the above-described operation is repeated. When Y=YE, S15 is performed.

In S15, it is determined whether or not all the sides of the polygon have been processed. When they have not been processed, the current operation returns to S3 and the above-described operation is repeated.

When all the sides of the polygon have been processed, S16 is performed. In S16, it is determined whether or not all the polygons have been processed. If they have not been processed, the current operation returns to S2 and the above-described operation is repeated. When it is determined in S16 that all the polygons have been processed, the current operation, that is, the outline shape processing is terminated.

With reference to FIG. 21, the operation of the polygon interior processing device 30 will be described.

The polygon interior processing device 30 initializes the Y address in S21, reads the number of polygons for the Y address of a scan-line in S22, and then performs S23.

In S23, for the Y address, the polygon outline left-side X address (XS) between the two points on the opposite two sides, mapping Y address (MYS), X address (MXS) and Z value address (ZL) are read out from the work memory 6.

In S24, for the Y address, the polygon outline right-side X address (XE) between the two points on the opposite two sides, mapping Y address (MYE), X address (MXE) and Z value address (ZR) are read out from the work memory 6.

Then, in S25 and S27, the mapping parameter operation and hidden surface removal processing parameter operation are performed by the parameter operation device 31. In these parameter operations, XE, XS data from the work memory 6 is provided to the subtracter in the parameter operation device 31 and the distance DX between XS and XE is calculated there. DX is provided to the derivative differential operation circuits.

The subtracters in the derivative differential operation circuits are provided with the mapping left-side addresses (MXS, MYS), right-side addresses (MXE, MYE), Z left-side address (ZL) and right-side address (ZR), respectively, and the subtraction results MXE−MXS, MYE−MYS and ZL−ZR are provided for the dividers, respectively.

The dividers perform division: (MXE−MXS)/DX, (MYE−MYS)/DX, (ZR−ZL)/DX, and the division results DDMX, DDMY and DDZ are provided to the horizontal interpolation processing device 32 and hidden surface removal processing device 34 as parameters, respectively, in S26 and S28.

The hidden surface removal processing device 34 obtains the Z values of a plurality of consecutive dots in S29, compares them with corresponding Z values of the Z-value line memory 11 and provides the comparison results for the pixel drawing device 33 and Z-value line memory 11, in S30. The horizontal interpolation operation device 32 obtains the mapping pattern memory addresses for the plurality of dots and the obtained addresses are transferred to the pixel drawing device 33, in S31.

The pixel drawing device 33 writes the addresses of the mapping pattern memory 7 for the plurality of dots in the color line memory 12 according to the result of the hidden surface removal operation, in S32.

In S33, it is determined whether or not all the polygons on the scan-line have been processed. When they have not been processed, the current operation returns to S23 and the above-described operation is repeated.

When all the polygons on the single scan-line (i.e., Y address) have been processed, the pixel drawing device 33 stores the addresses of the mapping pattern memory 7 for the number of dots for the one scan in the color line memory 12. The stored mapping pattern memory 7 addresses are sequentially read out from the color line memory 12. Thereby, the corresponding R, G, B values are read out from the mapping pattern memory 7 and the read out values are written in the frame memory 8, in S34. In S35, the Y address is incremented, and, until the processing for all the Y addresses have been finished, that is, until the Y address exceeds the vertical resolution, the current operation returns to S22, in S36, and thus the above-described operation is repeated. When the processing for all the Y addresses has been processed, the current operation is terminated.

In the above-described embodiment, in a case where the processing rate of the pixel drawing device 33 is high, it is possible that the frame memory 8 is omitted and the R, G, B, and so forth image data is transferred directly from the pixel drawing device 33 to the CRT 9, and is used for displaying images on the CRT 9.

Figure 29:
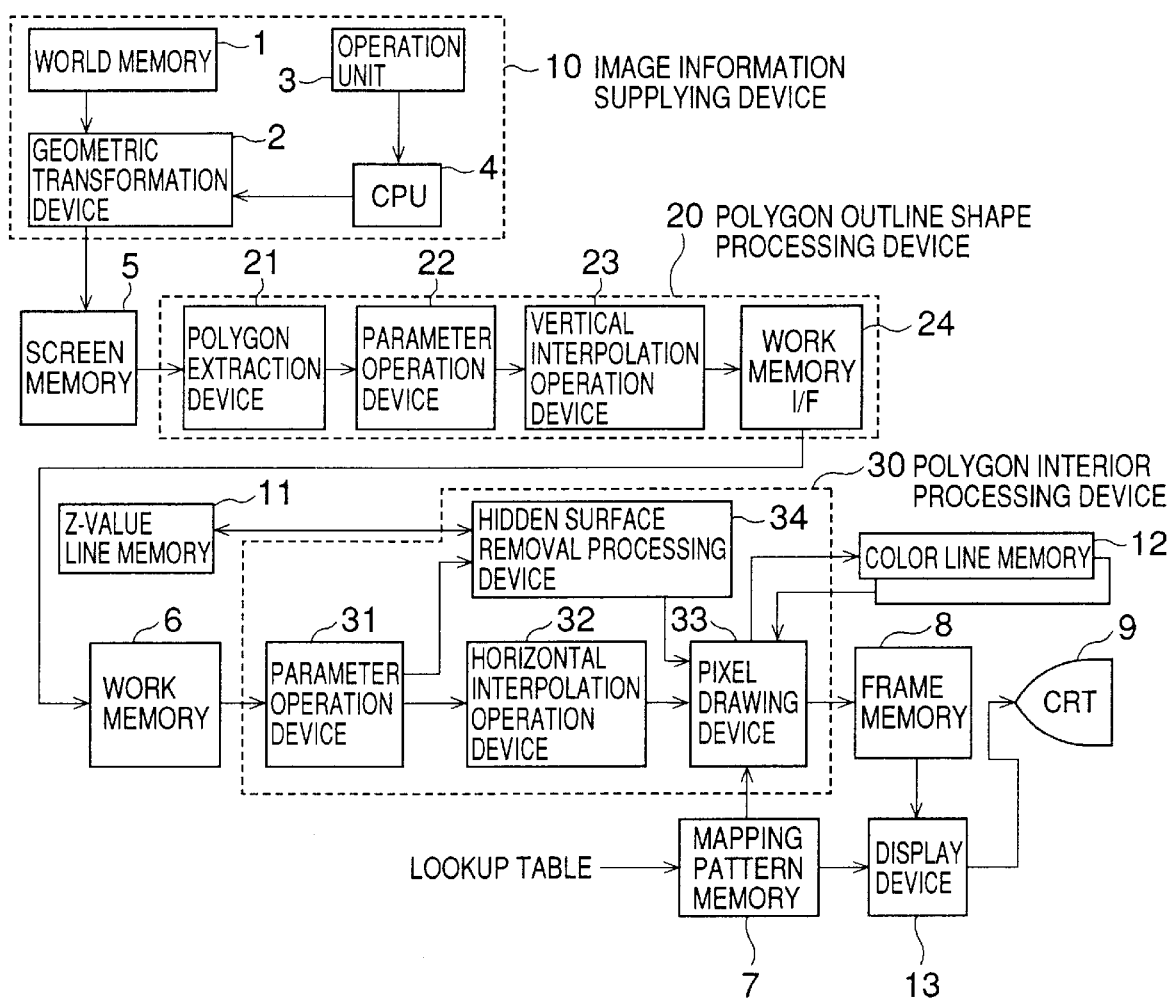
FIG. 29 shows a block diagram of a 3D image display apparatus in a second embodiment of the present invention.

FIG. 29 shows a block diagram of another embodiment resulting from modifying the system of the first embodiment shown in FIG. 1. In the system shown in FIG. 29, the pixel drawing device 33 does not write the R, G, B values in the frame memory 8, but writes the addresses of the mapping pattern memory 7. A display device 13 sequentially reads out the mapping pattern memory addresses from the frame memory 8, thus accesses the mapping pattern memory 8 using the read out addresses and transfers the corresponding R, G, B values from the mapping pattern memory 7 to the CRT 9.

Figure 30:
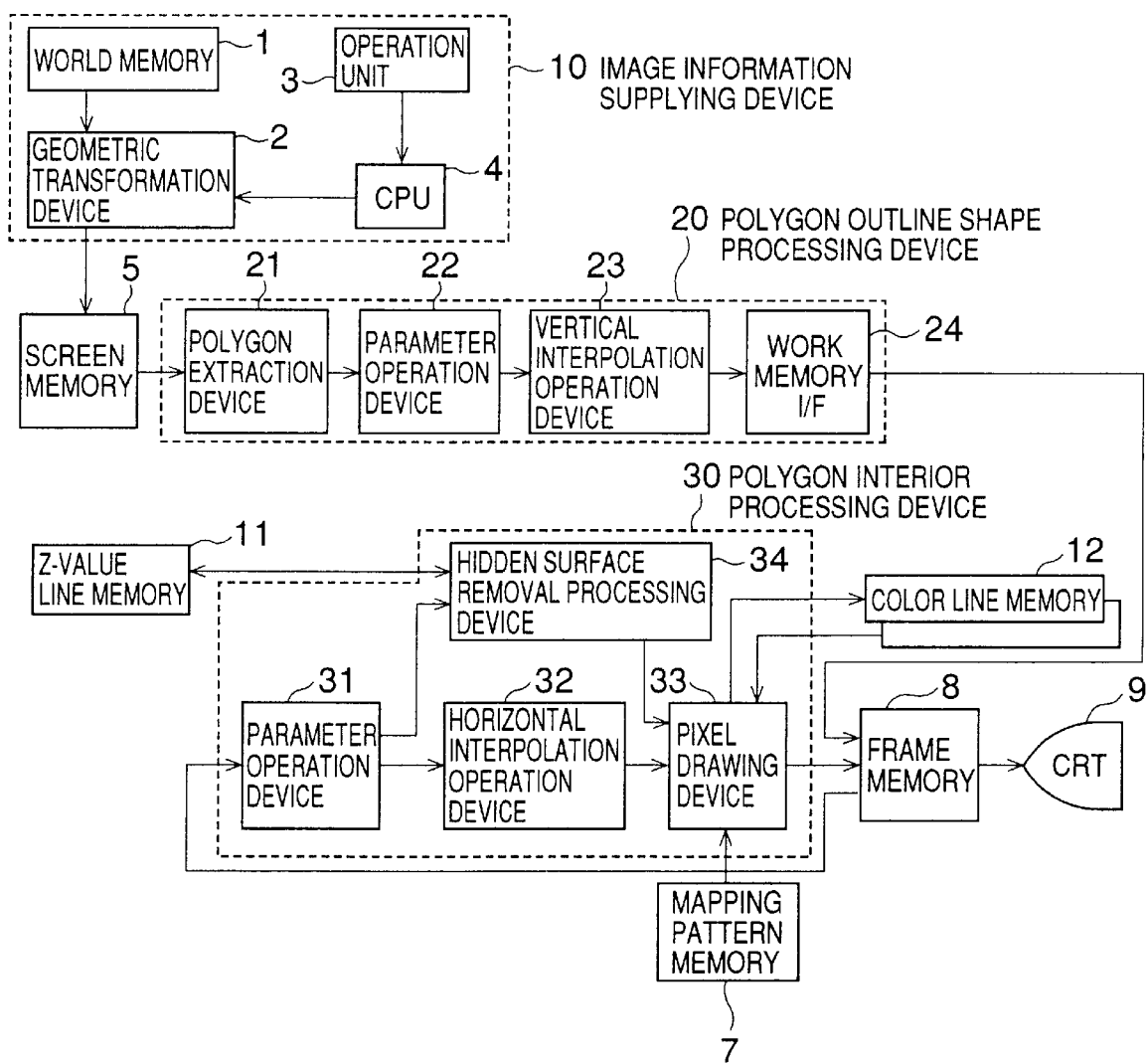
FIG. 30 shows a block diagram of a 3D image display apparatus in a third embodiment of the present invention.

FIG. 30 shows a block diagram of yet another embodiment resulting from modifying the system of the first embodiment shown in FIG. 1.

In the system shown in FIG. 30, the contents of the work memory 6 shown in FIG. 1 are set in a free area of the frame memory 8, and the frame memory 8 is used for two separate purposes (as the original frame memory 8 and also as the work memory 8) in a time-sharing manner.

The present invention is not limited to the above-described embodiments, and variations and modifications may be made without departing from the scope of the present invention.

What is claimed is:

1. A 3D image processing apparatus comprising:
   storage means for storing polygon X, Y vertex information, mapping pattern vertex information and polygon Z-value information;
   geometric transformation means for performing a geometric transformation operation on vertex information from said storage means;
   polygon outline shape processing means for using transformed vertex information from said geometric transformation means and, for each scan-line, converting said polygon X, Y vertex information, mapping pattern vertex information and polygon Z-value information into polygon outline information, wherein said polygon X, Y vertex information is only converted between a Y start point address and a Y end point address corresponding to each polygon side;

horizontal interpolation means for interpolating for the polygon interior, for each scan-line, using said polygon outline information provided by said polygon outline shape processing means;

hidden surface removal means for performing a hidden surface removal operation as a result of comparing Z-values of dots on a scan-line with Z-values of corresponding dots previously stored in a Z-value line memory, said horizontal interpolation means and said hidden surface removal means performing operations in parallel on each of a plurality of dots of one scan-line;

pixel drawing means for determining mapping pattern information of dots on a scan-line, using polygon interior information provided by said horizontal interpolation means;

said pixel drawing means writing in a pixel line memory said mapping pattern information of said dots on said scan-line when the result of said hidden surface removal operation allows said dots to be drawn; and a mapping pattern memory comprising a lookup table of basic patterns;

said pixel drawing means using said mapping pattern information from said pixel line memory, accessing said mapping pattern memory, reading corresponding image information comprising said basic patterns, and transferring said image information to a display device.

2. The 3D image processing apparatus according to claim 1, further comprising Z-value operation means for using said polygon interior information provided by said horizontal interpolation means and calculating the Z-values of a plurality of dots on a scan-line in parallel, Z-values being transferred to said hidden surface removal means to be used in the comparison operation.

3. The 3D image processing apparatus according to claim 2, wherein said Z-value operation means comprises a plurality of adders coupled with each other in series for providing sequentially incremented Z-values of a plurality of consecutive dots, respectively, in parallel, as a result of each adder adding an increment to the output of the preceding adder.

4. A 3D image processing apparatus comprising:
a depth-value line memory for storing depth values of polygons on a scan-line;
horizontal interpolation means for interpolating for a polygon interior, for each scan-line, using polygon outline information, said polygon outline information being converted from polygon X, Y vertex information, mapping pattern vertex information, and polygon Z-value information, wherein said polygon X, Y vertex information is only converted between a Y start point address and a Y end point address corresponding to each polygon side;
hidden surface removal means for receiving the depth values of a polygon on a scan-line, comparing currently received depth values with depth values previously stored in said depth-value line memory, thus performing a predetermined hidden surface removal operation, and updating said depth values previously stored in said depth-value line memory when the result of said predetermined hidden surface removal operation allows the updating, said horizontal interpolation means and said hidden surface removal means performing operations in parallel on each of a plurality of dots of one scan-line;
pixel drawing means for drawing pixels of said polygons, for said scan-line, said pixels comprising pixels which are allowed to be drawn according to said result of said hidden surface removal operation.

5. A 3D image processing method comprising the steps of:
receiving depth values of a polygon on a scan-line;
performing a horizontal interpolation step for interpolating for a polygon interior, for each scan-line, using polygon outline information, said polygon outline information being converted from polygon X, Y vertex information, mapping pattern vertex information, and polygon Z-value information, wherein said polygon X, Y vertex information is only converted between a Y start point address and a Y end point address corresponding to each polygon side;
performing a hidden surface removal step for comparing depth values currently being received in said receiving step with depth values previously stored in a depth-value line memory and thus performing a predetermined hidden surface removal operation, said depth-value line memory comprising a line memory which stores the depth values of polygons on a scan-line;
updating said depth values previously stored in said depth-value line memory when the result of said predetermined hidden surface removal operation allows the updating, said horizontal interpolation step and said hidden surface removal step being performed in parallel on each of a plurality of dots of one scan-line;
drawing pixels of said polygons, for said scan-line, said pixels comprising pixels which are allowed to be drawn according to said result of said hidden surface removal operation.

6. A 3D image processing apparatus comprising:
a memory storing polygon X, Y vertex information, mapping pattern vertex information and polygon Z-value information;
a geometric transformation device connected with the memory and receiving vertex information of each polygon from the memory and for performing a geometric transformation operation on the vertex information;
a polygon outline shape processing device functionally connected with the geometric transformation device via a screen memory and using transformed vertex information from said geometric transformation device and, for each scan-line, converting said polygon X, Y vertex information, mapping pattern vertex information and polygon Z-value information into polygon outline information, wherein said polygon X, Y vertex information is only converted between a Y start point address and a Y end point address corresponding to each polygon side, said polygon outline shape processing device outputting calculated data for storage in a work memory;
a parameter operation device receiving from the work memory for each scan-line the calculated data and calculating based thereon horizontal interpolation operation parameters;
a horizontal interpolation operation device receiving the parameters from the parameter operation device for interpolating for the polygon interior for each scan-line;

a Z-value line memory having a capacity limited to storing up to one scan-line worth of Z-values;

a hidden surface removal processing device functionally connected with receiving data from the parameter operation device and Z-value line memory and performing a hidden surface removal operation by comparing Z-values of dots on a scan-line with Z-values of corresponding dots previously stored in the Z-value line memory, said horizontal interpolation operation device and said hidden surface removal processing device performing operations in parallel on each of a plurality of dots of one scan-line;

a mapping pattern memory storing a lookup table of basic patterns; and a pixel drawing device having inputs connected with an output of the horizontal interpolation operation device and an output of the hidden surface removal processing device, said pixel drawing device determining mapping pattern information of dots on a scan-line, using polygon interior information output by said horizontal interpolation means and writing in a pixel line memory said mapping pattern information of said dots on said scan-line when the output by said hidden surface removal processing device allows said dots to be drawn said pixel drawing device receiving said mapping pattern information from said pixel line memory, accessing said mapping pattern memory, reading corresponding image information comprising said basic patterns, and transferring said image information to a display device.

7. The 3D image processing apparatus according to claim 6, said hidden surface removal processing device comprising a Z-value operation device calculating the Z-values of a plurality of dots on a scan-line in parallel accordingly.

8. The 3D image processing apparatus according to claim 7, wherein said Z-value operation device comprises a plurality of adders coupled with each other in series for providing sequentially incremented Z values of a plurality of consecutive dots, respectively, in parallel, as a result of each adder adding an increment to the output of the preceding adder.

9. A 3D image processing apparatus comprising:

a depth-value line memory having c capacity limited to storing up to one scan-line worth of depth values of polygons on a scan-line;

a horizontal interpolation device interpolating for a polygon interior, for each scan-line, using polygon outline information, said polygon outline information being converted from polygon X, Y vertex information, mapping pattern vertex information, and polygon Z-value information, wherein said polygon X, Y vertex information is only converted between a Y start point address and a Y end point address corresponding to each polygon side;

a hidden surface removal processing device having an input connected with an output of the depth-value line memory for receiving the depth values of a polygon on a scan-line, said hidden surface removal processing device including a comparator for comparing currently received depth values with depth values previously stored and output by said depth-value line memory, performing a predetermined hidden surface removal operation based on a result of the comparison, and updating said depth values previously stored in said depth-value line memory being updated when the result of said predetermined hidden surface removal operation allows the updating, said horizontal interpolation device and said hidden surface removal processing device performing operations in parallel on each of a plurality of dots of one scanline;

a pixel drawing device for drawing pixels of said polygons, for said scan-line, said pixels comprising pixels which are allowed to be drawn according to said result of said hidden surface removal operation performed by said hidden surface removal processing device.

10. A 3D image processing apparatus comprising:

an image information supplying device for performing processing on polygon information and for outputting information including, for each polygon vertex, X and Y screen coordinates, a Z-value and X and Y coordinates of the mapping pattern memory;

a screen memory, having an input for receiving the information output by said image information supplying device and for storing the information;

a polygon outline shape processing device having an input for receiving the information stored in said screen memory and calculating outline information, mapping pattern addresses and Z-values for each polygon based on the received information, said outline information being calculated by converting, for each scan-line and for each polygon, said X and Y screen coordinates, Z-value, and X and Y coordinates of the mapping pattern memory, wherein said X and Y screen coordinates are only converted between a Y start point address and a Y end point address corresponding to each polygon side;

a work memory having an input functionally connected to an output of the polygon outline shape processing device for receiving and storing polygon information including the outline information, mapping pattern addresses and Z-values for each polygon calculated by said polygon outline shape processing device;

a Z-value line memory for storing up to one scan-line of Z-values; and a polygon interior processing device having inputs connected to and receiving outputs from said work memory and Z-value line memory, said polygon interior processing device performing hidden surface removal using a Z-buffer method by calculating Z-values of dots and comparing the calculated Z-values with the Z-values stored in said Z-line memory and a horizontal interpolation operation calculating mapping memory addresses, said horizontal interpolation and said hidden surface removal being performed in parallel on each of a plurality of dots of one scan-line.

11. A 3D image processing apparatus as recited in claim 10, said image information supplying device comprising a geometric transformation device that performs operations necessary for determining object movement and rotational change of a view, performs geometric transformation and outputs 2D screen data to the screen memory.

12. A 3D image processing apparatus as recited in claim 10, said polygon outline shape processing device comprising a polygon extraction device that reads out from the screen memory information including information of vertices of each side forming a polygon and the Z-value of the polygon and determines which direction corresponds to each side vector forming the polygon and determines whether vertices of the sides forming the polygon belong to a right or left side accordingly.

13. A 3D image processing apparatus as recited in claim 12, said polygon outline shape processing device further comprising a parameter operation device receiving an output from said polygon extraction device for calculating parameters necessary for digital differential analysis to obtain outline information of the polygon.

14. A 3D image processing apparatus as recited in claim 13, said polygon outline shape processing device further comprising a vertical interpolation operation device receiving information output by said parameter operation device and for calculating outline information, mapping pattern addresses and Z-values.

15. A 3D image processing apparatus as recited in claim 10, wherein said polygon interior processing device calculates mapping memory addresses used for accessing a mapping pattern memory for reading at least one of R, G, B and luminance data from the mapping pattern memory for each dot and writing read data into a frame memory.

16. A 3D image processing apparatus as recited in claim 15, wherein the frame memory and the work memory comprise portions of a same memory.

17. A 3D image processing apparatus as recited in claim 10, wherein said polygon interior processing device calculates mapping pattern memory addresses used fro accessing a mapping pattern memory for reading at least one of R, G, B and luminance data from a mapping pattern memory and writes the mapping memory addresses into a frame memory.

18. A 3D image processing apparatus as recited in claim 17, further comprising a display device which sequentially reads out the mapping pattern memory addresses from the frame memory using the read out addresses and transfers the stored at least one of R, G, B and luminance data from the mapping pattern memory to a display.

19. A 3D image processing method comprising the steps of:

obtaining information relating to polygons including start point addresses and end point addresses of each polygon side;

calculating direction vectors of each polygon side from the obtained start point and end point addresses;

determining based on the calculated direction vectors whether each polygon side is a left-side or a right-side;

calculating X, Z and mapping parameters to determine derivative differential values for X (DDMX), Z (DDZ) and mapping (DDMY) data;

performing vertical interpolation using the calculated derivative differential values to determine polygon information including outline information, mapping pattern addresses and Z-values;

calculating horizontal interpolation parameters necessary for a horizontal interpolation operation;

performing horizontal interpolation using the horizontal interpolation parameters to calculate mapping memory addresses used for accessing a mapping pattern memory;

storing up to one scan-line worth of Z-values in a Z-value line memory;

performing hidden surface removal processing by comparing Z-values stored in the Z-value line memory with Z-values calculated in the horizontal interpolation parameter calculation step, said horizontal interpolation and hidden surface removal processing being performed in parallel on each of a plurality of dots of one scanline; and controlling to display dots using the calculated mapping memory addresses and a result of the hidden surface removal processing.

* * * * *